United States Patent
Pierard et al.

(10) Patent No.: US 10,108,611 B1
(45) Date of Patent: Oct. 23, 2018

(54) PREEMPTIVE MACHINE TRANSLATION

(71) Applicant: Amazon Technologies, Inc., Seattle, WA (US)

(72) Inventors: Adrien Hubert Marie Pierard, Pittsburgh, PA (US); Christopher Pitstick, Pittsburgh, PA (US); Gregory Alan Hanneman, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/274,781

(22) Filed: Sep. 23, 2016

(51) Int. Cl.
*G06F 17/28* (2006.01)

(52) U.S. Cl.
CPC ........ *G06F 17/289* (2013.01); *G06F 17/2854* (2013.01)

(58) Field of Classification Search
CPC ............................ G06F 17/289; G06F 17/2854
USPC ............................................................ 704/2
See application file for complete search history.

(56) References Cited

U.S. PATENT DOCUMENTS

| | | | |
|---|---|---|---|
| 8,843,360 B1 * | 9/2014 | Johnston ................. | G06F 9/454 704/8 |
| 8,935,480 B1 | 1/2015 | Chien et al. | |
| 2004/0254781 A1 | 12/2004 | Appleby | |
| 2005/0055217 A1 * | 3/2005 | Sumita ................. | G06F 17/2818 704/277 |
| 2011/0225104 A1 * | 9/2011 | Soricut ................. | G06F 17/289 705/348 |
| 2016/0162478 A1 * | 6/2016 | Blassin ............ | G06Q 10/06311 706/12 |
| 2016/0378748 A1 * | 12/2016 | Shoshan ........ | G06Q 10/063112 704/2 |

OTHER PUBLICATIONS

Office Action for U.S. Appl. No. 15/274,562, dated Aug. 3, 2017, Pierard, entitled "Incremental and Preemptive Machine Translation" (18 pages).
Office Action for U.S. Appl. No. 15/274,562, dated Feb. 22, 2018, Pierard, entitled "Incremental and Preemptive Machine Translation", 19 pages.

* cited by examiner

*Primary Examiner* — Bharatkumar S Shah
(74) *Attorney, Agent, or Firm* — Lee & Hayes, PLLC

(57) ABSTRACT

A machine translation system capable of incremental and preemptive machine translation is disclosed. Content items on a page can be provided to multiple machine translation services for translation. Each of the machine translation services is capable of translating content items at a different quality level. Content items translated at a lower quality level might be received before content items translated at a higher quality level and presented in a user interface (UI). When content items translated at a higher quality level are received, the translated content items can be used to replace the lower quality level translations previously presented in the UI. Content items referenced by pages identified in search results can also be preemptively machine translated, cached, and provided when requests are received for the translated content items.

20 Claims, 13 Drawing Sheets

PREEMPTIVE MACHINE TRANSLATION

BACKGROUND

One problem with the provision of machine translated content on the Internet and, potentially, other types of networks, is that the generation of high quality machine translations of content can take a significant amount of time. As a result, computer users may become frustrated and navigate away from a site that provides machine translated content if the content cannot be presented quickly enough.

For example, a computer user might visit an Internet site that provides content that is machine translated from one human-readable language (e.g. English) to another human-readable language (e.g. Spanish or French). Machine translation of content from between human-readable languages can, however, take a long time to complete, particularly for degenerative cases. In these cases, it may take up to dozens of seconds in order to complete a machine translation of content and to present the content to a user.

Users often become frustrated by the extended length of time necessary to complete machine translations and, as a result, will navigate away from an Internet site or another type of site that provides machine translated content before the translated content can be presented to the user. Consequently, valuable computing resources, such as memory, processor cycles, storage space, and network bandwidth, are frequently wasted performing machine translations of content that is never viewed by a user.

The disclosure made herein is presented with respect to these and other considerations.

DETAILED DESCRIPTION

Figure 1:
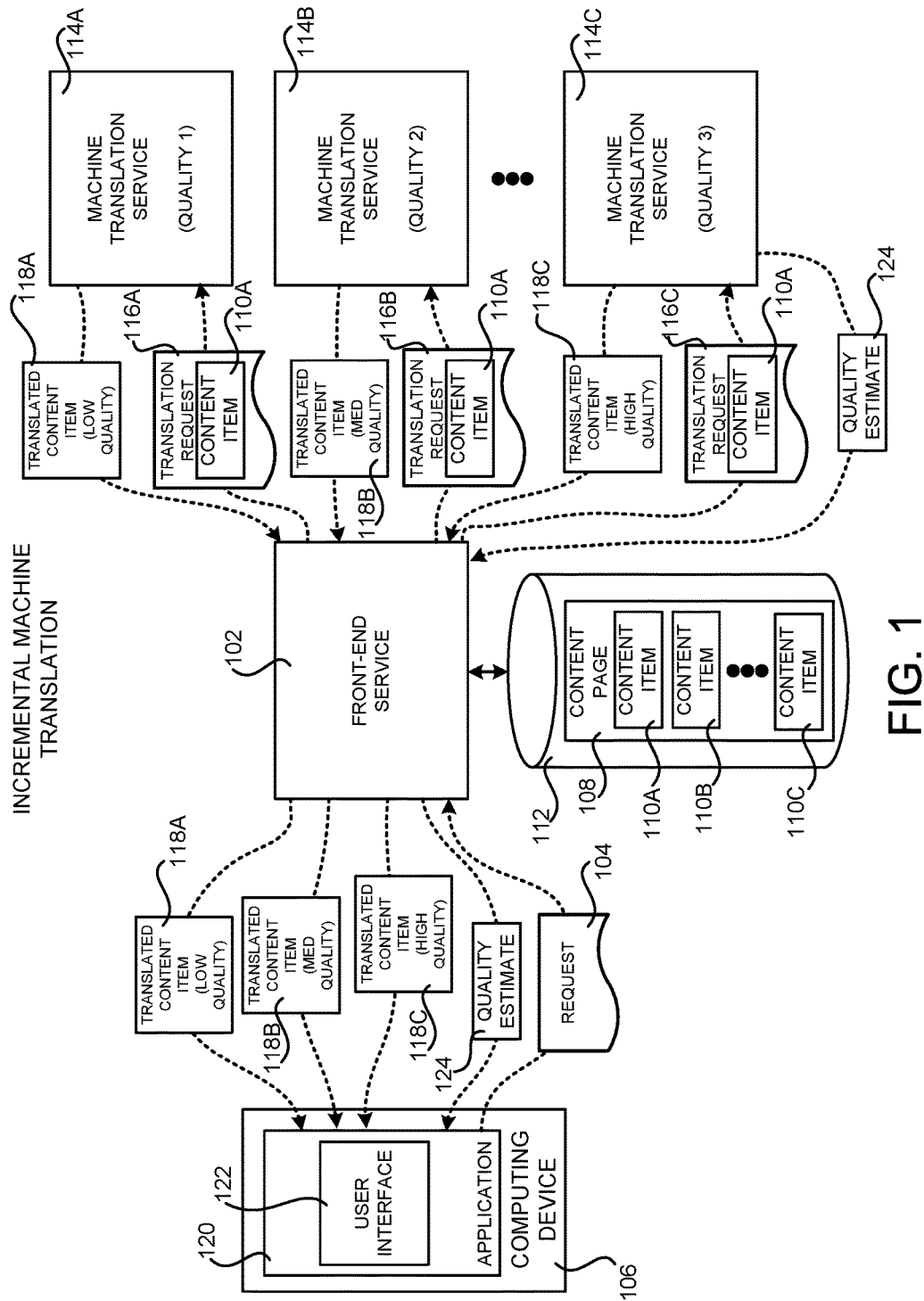
FIG. 1 is a computing system architecture diagram showing aspects of a computing system configured to provide incremental machine translation, according to one particular configuration.

The following detailed description is directed to technologies for incremental and preemptive machine translation. Through an implementation of the disclosed technologies, several translations of content items can be generated using incremental quality requirements. In this way, a lower quality translation of a content item can be quickly presented and then subsequently replaced by higher quality translations as they become available. By quickly presenting a lower quality translation of a content item to a user and later replacing the lower quality translation with higher quality translations as they become available, the user will be less likely to navigate away from the page. As a result, computing resources such as memory, processor cycles, storage space, and network bandwidth are not wasted performing translations that are never viewed by a user.

Moreover, in some configurations content items can be preemptively machine translated prior to the content being requested. In this way, higher quality translations can be provided at the time the content items are actually requested, which might also make users less likely to navigate away from a page containing the content items. Additional technical benefits other than those described briefly above can also be realized through an implementation of the technologies disclosed herein.

As will be discussed in greater detail below, a machine translation system is disclosed herein that is capable of incremental and preemptive machine translation. Incremental translation refers generally to a mechanism for performing machine translation of content items using multiple machine translation services. Each of the machine translation services is capable of translating content items at a different quality level. In some scenarios, content items translated at a lower quality level might be received before content items translated at a higher quality level and presented in a user interface ("UI"). When content items translated at a higher quality level are received, the translated content items can be presented in place of the lower quality level translations previously presented in the UI.

Preemptive machine translation generally refers to a mechanism for performing machine translation of content items before actual requests for the content item are received. For example, and without limitation, content items referenced by pages identified in search results can be preemptively machine translated, cached, and later provided when requests are received for the translated content items. Additional details regarding the various mechanisms described briefly above will be provided below with regard to FIGS. 1-12.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a computing system architecture diagram showing aspects of a computing system configured to provide incremental machine translation, according to one particular configuration. As illustrated in FIG. 1, a network service, referred to herein as the "front-end service 102", facilitates the incremental machine translation of content items 110, such as those on a content page 108 (which might be referred to herein simply as a "page"). In particular, the front-end service 102 can receive and respond to requests 104 (which might be referred to herein simply as "requests 104") from a computing device 106.

In one configuration, the requests 104 from the computing device 106 are for pages 108 that include content items 110A-110C. In other configurations, the requests 104 can be for the content items 110 themselves. The requests 104 can be generated by an application 120 executing on the computing device 106 such as, but not limited to, a Web browser, a network service, or another type of application capable of receiving and rendering or otherwise utilizing the content items 110A-110C. The computing device 106 can be a smartphone, tablet, e-reader, set-top box, server computer, gaming console, or another type of computing device. The requests 104 can also be generated by other types of applications executing on other types of computing systems in other configurations.

The content items 110 and the pages 108 can be static or can be generated dynamically by the front-end service 102, or another network service, and stored in an appropriate data store 112. The content items 110 can include text content or images. For example, and without limitation, the content items 110 might be text expressed in the English language. The content items 110 can also be images with or without human-readable text contained therein. In this case, optical character recognition ("OCR") and/or image recognition can be performed on the image to identify text and/or an object in the image. The text, or text describing a recognized object, can then be translated in the manner disclosed herein. In some cases, the translated text can be rendered onto the original image from which it was obtained.

In some configurations, the text is generated from speech and translated in the manner disclosed herein. Once translated, the text can be converted back to speech for presentation to a user. Other types of content items 110 containing information suitable for machine translation can also be utilized in other configurations. In this regard, it is to be appreciated that the content items 110 do not need to be associated with a content page 108 and can be translated in the manner described herein independently of a content page 108 in some configurations.

As discussed briefly above, the front-end service 102 facilitates the machine translation of the content items 110 in the content page 108. For example, and without limitation, a user of the computing device 106 can request to view the content page 108 in a human-readable language other than the language in which the content items 110 are expressed. For instance, the content items 110 can be text expressed in the English language, and a user of the computing device 106 can request to view the content page 108 in Spanish or French.

Responsive to receiving a request 104 for the page 108, the front-end service 102 can simultaneously submit translation requests 116 for each of the content items 110 on the page 108 to multiple machine translation services 114. For example, and without limitation, a translation request 116A can be transmitted to the machine translation service 114A to request translation of the content item 110A, a translation request 116B can be transmitted to the machine translation service 114B to request translation of the content item 110A, and a translation request 116C can be transmitted to the machine translation service 114C to request translation of the content item 110A. Although three machine translation services are illustrated in FIG. 1, it is to be appreciated that two or more machine translation services 114 can be utilized in the manner disclosed herein.

As illustrated in FIG. 1, the machine translation services 114 are configured to generate machine translations of content items 110 at varying levels of expected quality. As used herein, the term "quality" refers to an edit distance between a reference translation and a translation generated by a machine translation service 114. Other measures of the quality of a machine-generated translation can be utilized in other configurations.

In the configuration shown in FIG. 1, the machine translation service 114A can be expected to generally generate machine translations of content items 110 at a first quality level (e.g. low quality), the machine translation service 114B can be expected to generally generate machine translations of content items 110 of another quality (e.g. medium quality), and the machine translation service 114A can be expected to generally generate machine translations of content items 110 at yet another quality (e.g. high quality). Different aspects of the machine translation pipeline implemented by the machine translation services 114 and/or the type, number, and/or size of the translation models utilized can be modified in order to generate translations having different quality levels.

Due to the varying levels of expected quality of the translations generated by the machine translation services 114, the translations generated by the machine translation services 114 can be generated in varying amounts of time. For instance, in the example shown in FIG. 1, the machine translation service 114A might generate translations of content items 110 faster than the machine translation service 114B. Similarly, the machine translation service 114B might generate translations of content items 110 faster than the machine translation service 114C. In this regard, it is to be appreciated that it is not necessarily the case that a higher quality translation will take longer to generate than a lower quality translation.

It is to be appreciated that various machine translation technologies can be utilized to translate the content items 110. For example, and without limitation, the machine translation services 114 can utilize the machine translation pipeline, and other related technologies, described in U.S. patent application Ser. No. 14/867,932, which was filed on Sep. 28, 2015, and entitled "Optimized Statistical Machine Learning System with Rapid Adaptation Capability", and which is expressly incorporated by reference herein in its entirety. Other machine translation technologies can be utilized in other configurations.

When the machine translation services 114 have completed translation of the content item 110A, they will return a translated content item 118. As discussed above, each machine translation service 114 will return a translated content item 118 having a different level of quality. For instance, in the example shown in FIG. 1, the translated content item 118A is of a lower quality, the translated content item 118B is of a medium quality, and the translated content item 118C is of a high quality. Additionally, because each of the machine translation services 114 takes a different amount of time to generate a translated content item 118, the front-end service 102 will receive the translated content items 118A-118C at different times. For example, the translated content item 118A would typically but not always be received first, the translated content item 118B would typically but not always be received second, and the translated content item 118C would typically but not always be received last.

In order to present a translation of the content item 110A to a user of the computing device 106 quickly, the front-end service 102 can provide the translated content item 118A to the computing device 106 when it is received. The application 120 can then present the translated content item 118A in the UI 122. In this way, a low quality translation of the content item 110A can be quickly presented to the user of the computing device 106 to prevent the user from navigating away from the content page 108 containing the content item 110A. In this regard, it is to be appreciated that the UI 122 can be a visual UI or an audio-based UI.

When the front-end service 102 subsequently receives the translated content item 118B, the front-end service 102 can provide the translated content item 118B to the computing device 106. The application 120 can then replace the previously displayed translated content item 118A with the translated content item 118B in the UI 122 (i.e. when the UI 122 is a visual UI). In this way, the low quality translation of the content item 110A presented in the UI can be automatically replaced with a higher quality translation of the content item 110A when it is received by the front-end service 102. In a similar fashion, the translated content item 118C can be provided to the computing device 106 and replaced in the UI 122 when received by the front-end service 102.

If, for some reason, the translated content item 118C is received prior to the translated content item 118B, the translated content item 118A can be replaced in the UI by the translated content item 110C. Moreover, in some configurations the front-end service 102 can cache the translated content items 118. In this configuration, higher quality translated content items 118 can be immediately provided to the application 120 from the cache, if available. In this manner, higher quality translated content items 118 can be provided to the application 120 more quickly and presented in the UI 122.

It is to be appreciated that the application 120 can utilize various mechanisms to determine whether translated content items 118 are available from the front-end service 102. For example, and without limitation, a "pull" mechanism can be utilized where the application 120 periodically polls the front-end service 102 to determine whether new translated content items 118 are available. Alternately, a "push" mechanism can be utilized where the front-end service 102 can inform the application 120 that new translated content items 118 are available. The application 120 can then retrieve the translated content items 118 from the front-end service or another location. The application 120 can utilize other mechanisms to obtain the translated content items 118 from the front-end service 102 in other configurations.

It is also to be appreciated that the process described above can be repeated for all of the content items 110A-110C on a page 108. In this way, lower quality translations of the content items 110A-110C can be quickly provided to a user of the computing device 106 in order to prevent the user from navigating away from the page 108.

In one configuration, the machine translation services 114 can also compute a quality estimate for the translations that they generate. For instance, in the example shown in FIG. 1, the machine translation service 114C has computed the quality estimate 124. The machine translation services 114A and 114B can compute quality estimates in a similar fashion. One mechanism for computing a quality estimate 124 for a machine translation is described in U.S. patent application Ser. No. 14/868,083, entitled "Optimized Statistical Machine Translation System With Rapid Adaptation Capability", which was filed on Sep. 28, 2015, and which is expressly incorporated herein by reference in its entirety. Other mechanisms for computing an estimate of the quality of a machine translation can also be utilized in other configurations.

As illustrated in FIG. 1, the quality estimates 124 can also be provided to the front-end service 102. The front-end service 102 can utilize the quality estimates 124 to determine whether a translated content item 118 is to be provided to the computing device 106. For example, and without limitation, the quality estimates 124 might indicate in some circumstances that the machine translation service 114A has generated a higher quality translation than the machine translation service 114C. In this scenario, the front-end service 102 might elect no to provide the translated content item 118C to the computing device 106.

In some configurations, the request 104 specifies a threshold quality for translations that the computing device 106 can accept. In these configurations, the front-end service 102 can utilize the threshold and the quality estimates 124 to identify those translated content items 118 that are to be provided to the computing device 106. Translated content items 118 that do not have a quality estimate 124 in excess of the threshold will not be provided to the computing device 106.

In a similar manner, the quality estimates 124 can also be provided to the computing device 120. In these configurations, the computing device 106 can utilize the quality estimates 124 to determine whether translated content items 118 are to be displayed or otherwise utilized. For example, and without limitation, a previously presented translated content item 118A might not be replaced in the UI 122 with a translated content item 118C unless it has a higher quality estimate 124. The computing device 106 can utilize the quality estimates 124 in other ways in other configurations. In one configuration, the front-end service 102 can also utilize the quality estimates 124 over time to determine which of the machine translation services 114 actually generates the highest quality translations. The front-end service 102 can also utilize the quality estimates 124 in other ways in other configurations.

Figure 2:
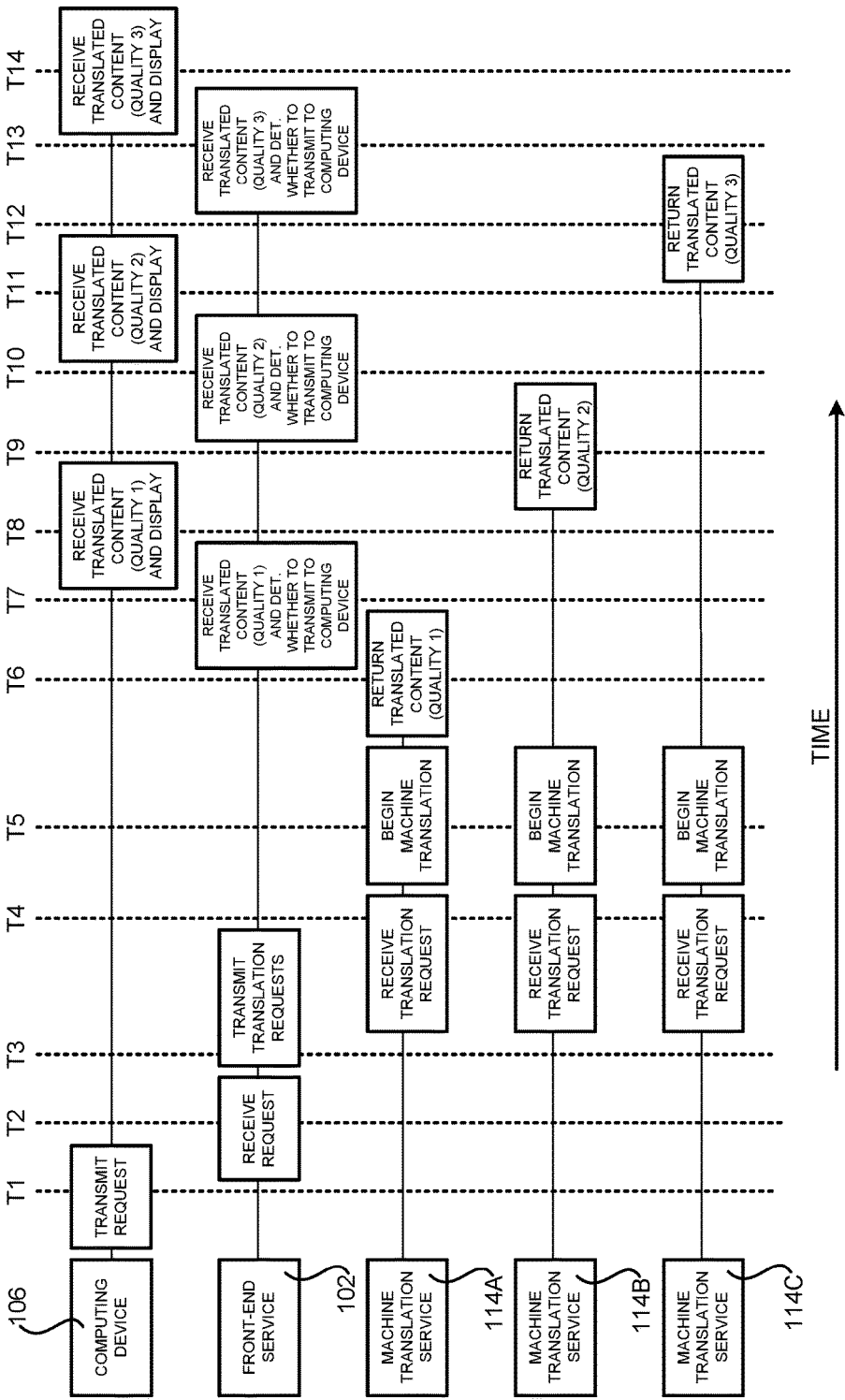
FIG. 2 is a timing diagram showing additional aspects of the computing system shown in FIG. 1 for providing incremental machine translation, according to one particular configuration.

FIG. 2 is a timing diagram showing additional aspects of the computing system shown in FIG. 1 for providing incremental machine translation, according to one particular configuration. In the illustrative example shown in FIG. 2, the computing device 106 transmits a request 104 for a page 108 that includes one or more content items 110 to the front-end service 102 at time T1. At time T2, the front-end service 102 receives the request 104. Thereafter, at time T3, the front-end service 102 transmits translation requests 116 for a content item 110A on the requested page 108 to the machine translation services 114A-114C. As shown in FIG. 2, the translation requests 116 can be sent to the machine translation services 114A-114C simultaneously.

At or around time T4, the machine translation services 114A-114C receive the translation requests 116A-116C, respectively. The machine translation services 114A-114C then begin their respective translations of the content item 110A identified by the translation requests 116 at time T5.

Because the machine translation service 114A is configured to provide a lower quality translation as compared to the other machine translation services 114B and 114C, the machine translation service 114A will typically but not always return the translated content item 118A first, at time T6. The front-end service 102 receives the translated content item 118A from the machine translation service 114A at time T7. The front-end service 102 also transmits the translated content item 118A to the computing device 106 at or just after this time. The application 120 receives the translated content item 118A at time T8 and presents the translated content item 118A in the UI 122 at or around this time.

The machine translation service 114B will typically, but not always, return the translated content item 118B next, at time T9. The front-end service 102 receives the translated content item 118B from the machine translation service 114B at time T10. The front-end service 102 also transmits the translated content item 118B to the computing device 106 at or just after this time. The application 120 receives the translated content item 118B at time T11 and replaces the translated content item 118A in the UI 122 with the translated content item 118B at or around this time.

The machine translation service 114C will typically, but not always, return the translated content item 118C last, at time T12. The front-end service 102 receives the translated content item 118C from the machine translation service 114C at time T13. The front-end service 102 also transmits the translated content item 118C to the computing device 106 at or just after this time. The application 120 receives the translated content item 118C at time T14 and replaces the translated content item 118B in the UI 122 with the translated content item 118C at or around this time.

The process shown in FIG. 2 can be performed for each of the content items 110 on a page 108 in parallel. In this way, translations for all of the content items 110 on a page 108 can be translated quickly and presented to a user of the computing device 106. Later, when higher quality translations become available, the higher quality translations can be presented to the user in place of the lower quality translations. Additionally, and as discussed above, the front-end service 102 can utilize quality estimates 124 generated by the machine translation services 114 to determine whether the translated content items 118 are to be provided to the computing device 106. This can occur at times T7, T10, and T14 in the example shown in FIG. 2. Additionally, the computing device 106 can utilize the quality estimates 124 to determine whether to display or otherwise utilize the translated content items 118 at times T8, T11, and T14.

Figure 3:
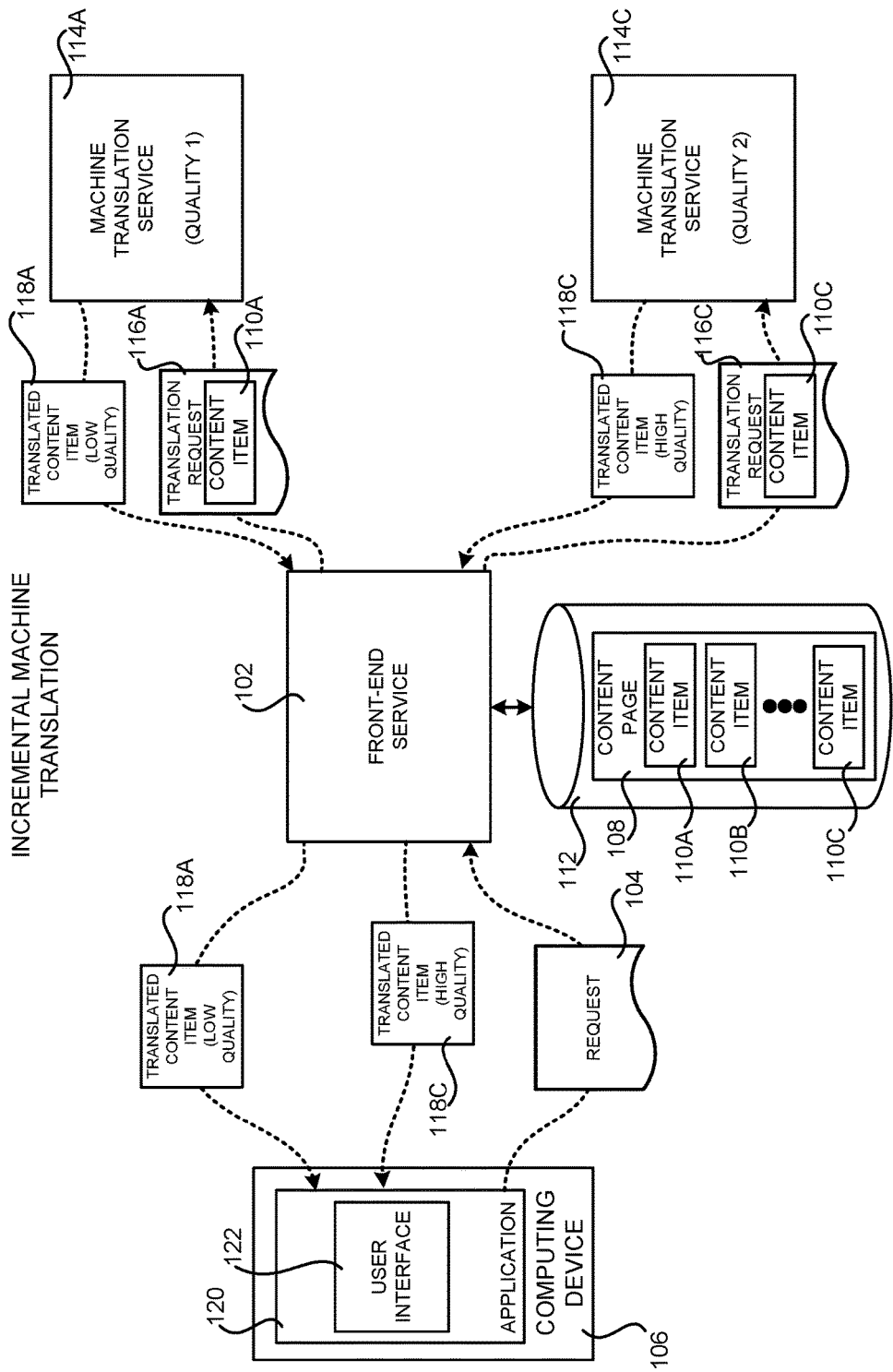
FIG. 3 is a computing system architecture diagram showing aspects of a computing system configured to provide incremental machine translation, according to another configuration.

FIG. 3 is a computing system architecture diagram showing aspects of a computing system configured to provide incremental machine translation, according to another configuration. In the configuration shown in FIG. 3, the content items 110 on a page 108 are not necessarily transmitted to each of the machine translation services 114A-114C for translation as in the configuration shown in FIGS. 1 and 2. Rather, in this configuration, the most appropriate machine translation service 114, or services, can be selected for translating each content item 110.

The machine translation service 114 to be utilized to translate a particular content item 110 can be selected based upon the location of the content item 110 on the page 108 when rendered. For example, and without limitation, a content item 110A that the application 120 presents in the UI initially (i.e. at the time the page 108 is first rendered), which might be referred to herein as being "above the fold," can be transmitted initially to the machine translation service 114A for quick translation and presentation in the manner described above with regard to FIGS. 1 and 2. The content item 110A can then be updated in the manner discussed above with regard to FIGS. 1 and 2. Content items 110, such as the content item 118C in FIG. 3, that will not be presented in the UI initially, which might be referred to herein as being "below the fold," might be initially sent directly to the machine translation service 114C for a higher quality translation since these items will not be presented immediately and, consequently, there is more time to translate these items at a higher quality.

In this regard, it is to be appreciated that the order in which content items 110 are transmitted to the machine translation services 114 for translation can also be chosen based upon various attributes of the content items 110. For example, and without limitation, content items 110 above the fold can be sent for translation first, while content items 110 below the fold can be sent for translation later. The order in which content items 110 are transmitted to the machine translation services 114 for translation can also be chosen based upon other factors in other configurations.

The machine translation service 114 to be utilized to translate a particular content item 110 can also be selected based upon the type of the content item 110 to be translated. For example, and without limitation, content items 110 that utilize navigation elements in the UI 122 might be translated by the machine translation service 114C, while other types of content items 110 in the UI 122 might be translated by the machine translation service 114A and updated in the manner described above with regard to FIGS. 1 and 2. The order of translation of the content items 110 can also be selected based upon the type of the content item 110.

The machine translation service 114 to be utilized to translate a particular content item 110 can also be selected based upon the size of the content item 110. For example, and without limitation, short spans of text can be sent to the machine translation service 114C for high quality translation since translation of shorter spans of text can be performed more quickly. Longer spans of text can be sent to the machine translation service 114A for quick translation and later be updated in the manner described above with regard to FIGS. 1 and 2. The order of translation of the content items 110 can also be selected based upon the size of the content item 110 to be translated.

The machine translation service 114 to be utilized to translate a particular content item 110 can also be selected based upon preferences specified by the user of the application 120. For example, the user might indicate that they are willing to wait for higher quality translations and that, therefore, content items 110 are to be transmitted to the machine translation service 114C for translation. The order of translation of the content items 110 can also be selected based upon user preferences. The machine translation service 114, or services, for translating a particular content item 110 can also be selected based upon other factors such as, but not limited to, network speed (e.g. the speed of the network connection between the computing device 106 and the front-end service 102) and/or the geographic location of the computing device 106.

The machine translation service 114 to be utilized to translate a particular content item 110 can also be selected based upon an estimated difficulty of translation of a content item 110. For example, long spans of text in certain languages (e.g. Japanese or Chinese), can be very difficult to translate. Consequently, these types of content items 110 can be initially sent to the machine translation service 114A for translation and updated in the manner described above. Spans of text that are estimated to be easier to translate can be transmitted to the machine translation service 114C for immediate high quality translation.

Figure 4:
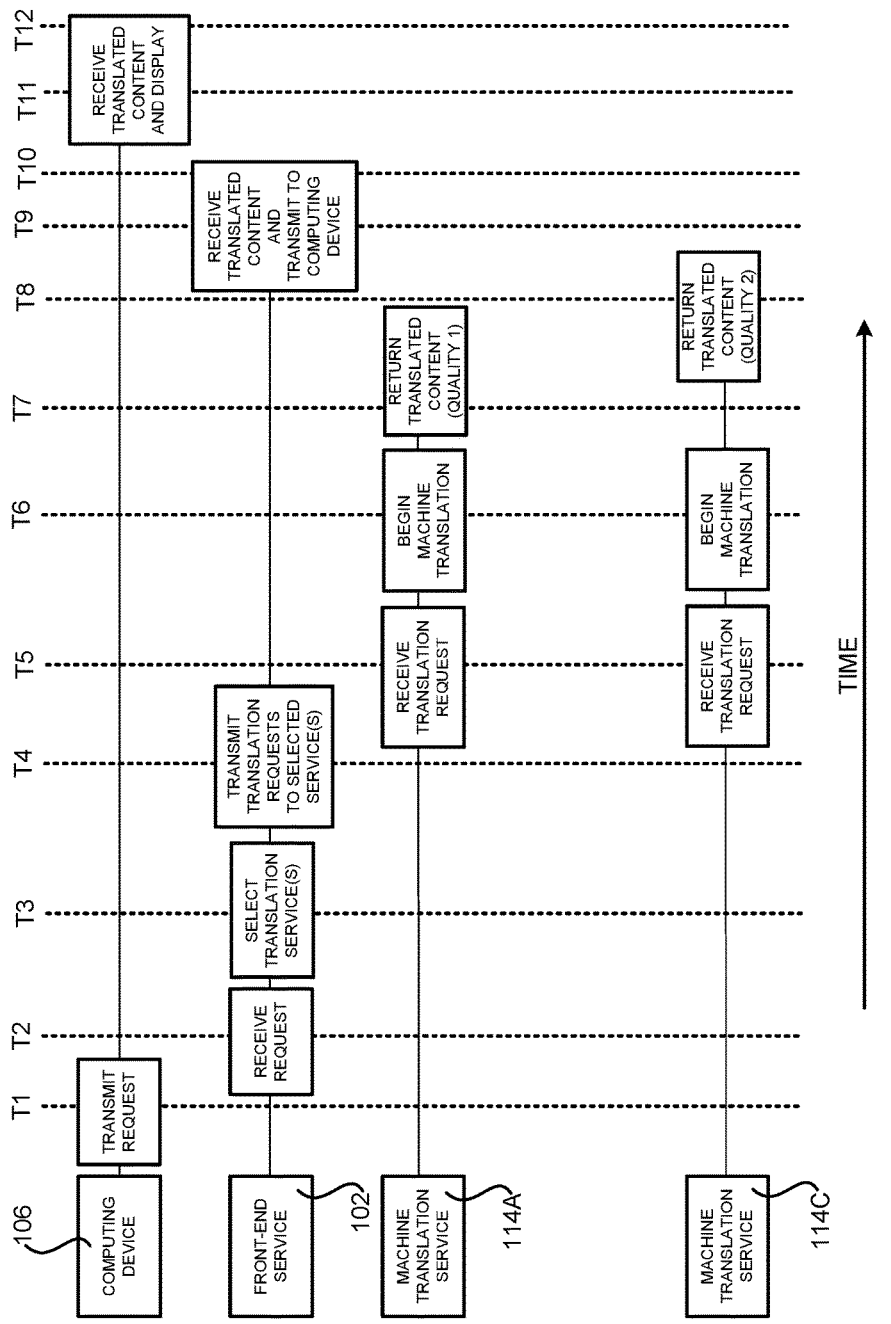
FIG. 4 is a timing diagram showing additional aspects of the computing system shown in FIG. 3 for providing incremental machine translation, according to one particular configuration.

FIG. 4 is a timing diagram showing additional aspects of the computing system shown in FIG. 3 for providing incremental machine translation, according to one particular configuration. As shown in FIG. 4, the computing device 106 transmits a request 104 for a page 108 that includes one or more content items 110 to the front-end service 102 at time T1. At time T2, the front-end service 102 receives the request 104. Thereafter, at time T3, the front-end service 102 selects the translation service 114, or services 114, that are to be utilized to translate the content items 110 in the requested page 108.

As discussed above, the machine translation service 114, or services, to be utilized to translate each of the content items 110 can be selected based upon various factors. Once the machine translation services 114 have been selected, the front-end service 102 transmits translation requests 116 for the content items 110 on the requested page 108 to the selected machine translation services at time T4. In the example shown in FIGS. 3 and 4, for instance, the front-end service 102 has selected the machine translation service 114A for translating the content item 110A and has selected the translation service 114C for translating the content item 110C. As shown in FIG. 4, the translation requests 116 can be sent to the machine translation services 114A and 114B simultaneously.

At or around time T5, the machine translation services 114A and 114C receive the translation requests 116A and 116B, respectively. The machine translation services 114A and 114C then begin their respective translations of the content item 110A identified by the translation requests 116 at time T6.

Because the machine translation service 114A is configured to provide a lower quality translation in the example shown in FIG. 4 as compared to the machine translation service 114C, the machine translation service 114A will typically but not always return the translated content item 118A first, at time T7. The front-end service 102 receives the translated content item 118A from the machine translation service 114A at time T9. The front-end service 102 also transmits the translated content item 118A to the computing device 106 at or just after this time. The application 120 receives the translated content item 118A at time T11 and presents the translated content item 118A in the UI 122 at or around this time.

The machine translation service 114C will typically, but not always, return the translated content item 118C after the machine translation service 114A has returned the translated content 118A, at time T8. The front-end service 102 receives the translated content item 118C from the machine translation service 114C at time T10. The front-end service 102 also transmits the translated content item 118C to the computing device 106 at or just after this time. The application 120 receives the translated content item 118C at time T12 and presents the content item 118C in the UI 122.

Figure 5:
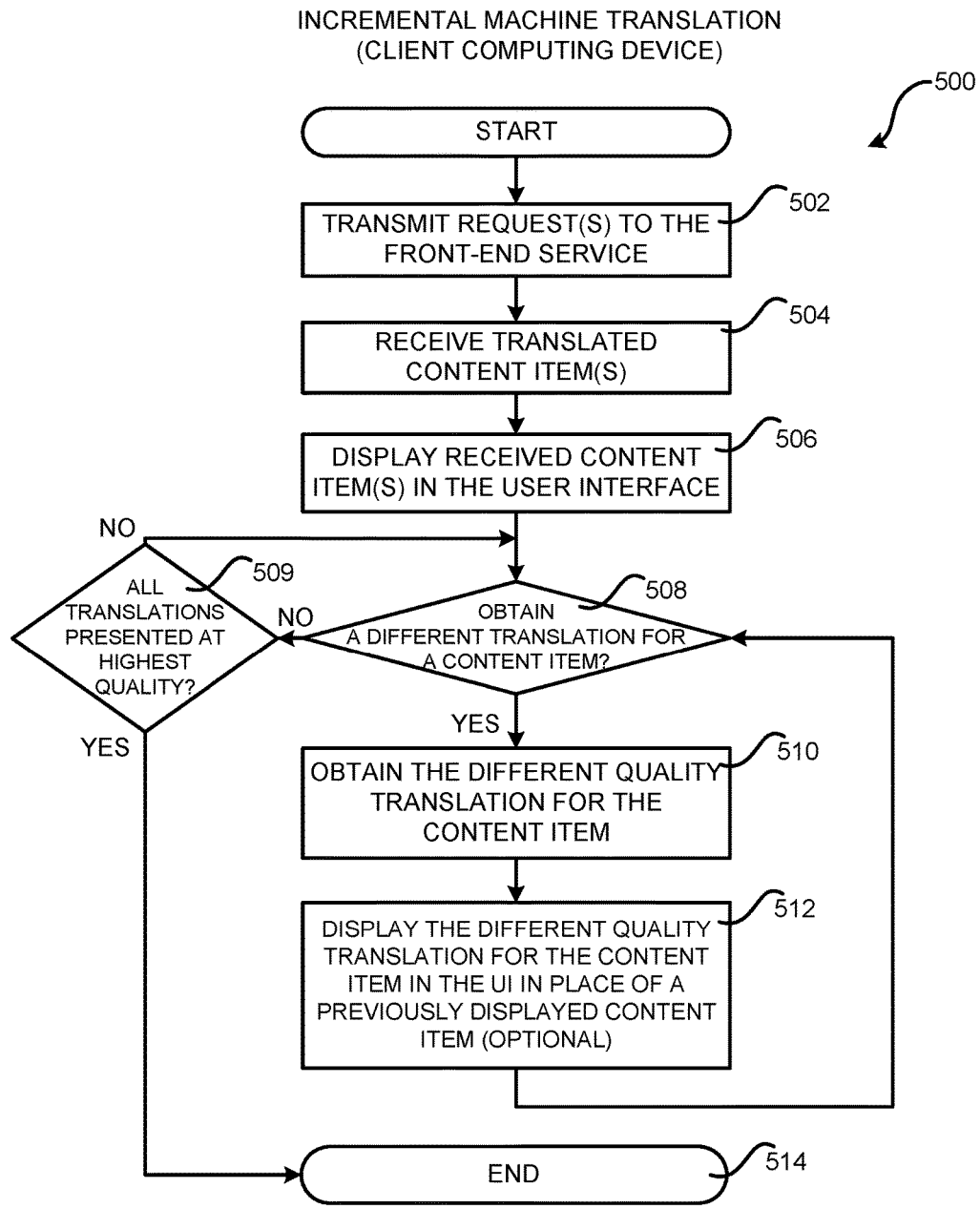
FIG. 5 is a flow diagram showing a routine that illustrates aspects of the operation of a client computing device when utilized in conjunction with the computing system shown in FIGS. 1 and 3 for providing incremental machine translation, according to one particular configuration.

FIG. 5 is a flow diagram showing a routine 500 that illustrates aspects of the operation of the client computing device 106 when utilized in conjunction with the computing system shown in FIGS. 1 and 3 for providing incremental machine translation, according to one particular configuration. It should be appreciated that the logical operations described herein with respect to FIG. 5, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 500 begins at operation 502, where the computing device 106 transmits a request 104 for a page 108 containing content items 110 to the front-end service 102. The routine 500 then proceeds from operation 502 to operation 504, where the computing device 106 receives a translated content item 118 from the front-end service 102. For example, and without limitation, the computing device 106 might receive a lower quality translated content item 118A generated by the machine translation service 114A. The routine then proceeds from operation 504 to operation 506, where the received translated content item 118 can be presented in the UI 122 or otherwise utilized. The routine 500 then proceeds from operation 506 to operation 508.

At operation 508, the application 120 determines whether a different (e.g. higher quality) translation is available for a translated content item 110 that has previously been received by the computing device 106. If a different translated content item 110 is available for a previously presented content item 110, the routine 500 proceeds from operation 508 to operation 510.

At operation 510, the application 120 obtains the different (e.g. higher quality) translated content item 118 from the front-end service 102. As discussed above, various push and pull mechanisms, or combinations thereof, can be utilized to determine whether translated content items 118 are available from the front-end service 102 and to obtain the translated content items 118 from the front-end service 102.

From operation 510, the routine 500 proceeds to operation 512, where the application 122 might present the different translated content item 110 in the UI 122 in place of the previously presented translated content item 110. The application 122 can utilize the different translation in different ways in other configurations. The routine 500 then proceeds from operation 512 back to operation 508, where additional translated content items 118 can be processed by the application 120 in a similar manner.

If, at operation 508, the application 122 determines that a different translated content item is not available, the routine 500 proceeds to operation 509. At operation 509, the application 122 determines if all of the translations for content items 110 on a page 108 have been presented at the highest possible quality. If not, the routine 500 proceeds back to operation 508, where additional translations can be obtained. If so, the routine 500 proceeds from operation 509 to operation 514, where it ends.

Figure 6:
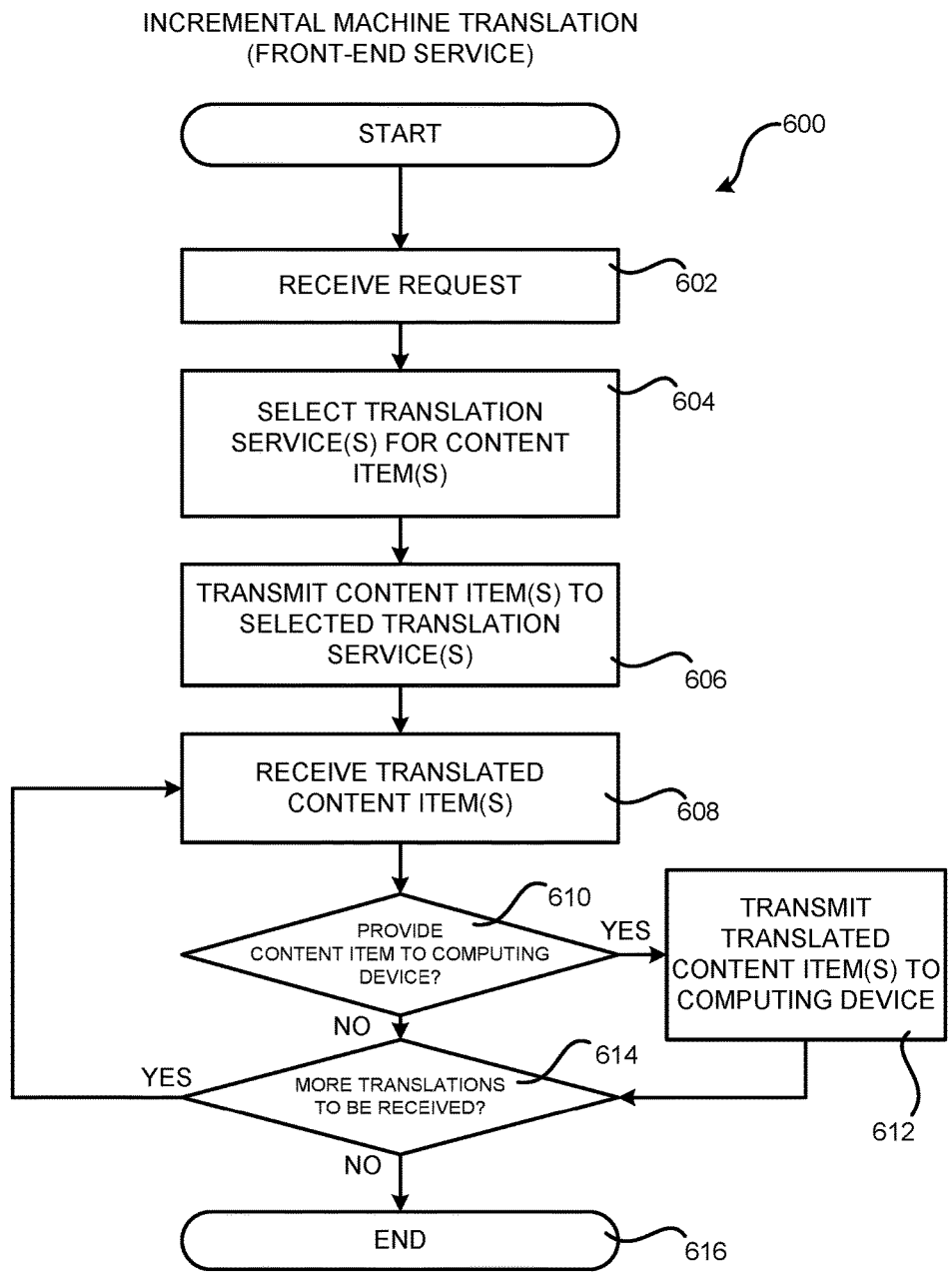
FIG. 6 is a flow diagram showing a routine that illustrates aspects of the operation of a front-end service for providing incremental machine translation in the computing system shown in FIGS. 1 and 3, according to one particular configuration.

FIG. 6 is a flow diagram showing a routine 600 that illustrates aspects of the operation of the front-end service 102, which was described above with regard to FIGS. 1 and 3. The routine 600 begins at operation 602, where the front-end service 102 receives a request 104 from the application 120. In response to receiving the request 104, the routine 600 proceeds to operation 604, where the front-end service 102 selects the translation service 114, or services, for translating content items 110 on the requested page 108.

As discussed above with regard to FIGS. 1 and 2, the content items 110 can be simultaneously transmitted to multiple machine translation services 114 for translation and presentation at different quality levels in one configuration. As also discussed above with regard to FIGS. 3 and 4, specific machine translation services 114 can be selected for each of the content items 110 on the requested page 108 based upon attributes of the content items 110 and/or other parameters. Once the machine translation services 114 have been selected, the routine 600 proceeds from operation 604 to operation 606, where the front-end service 102 transmits the content items 110 to the selected machine translation services 114 for translation. The routine 600 then proceeds from operation 606 to operation 608.

At operation 608, the front-end service 102 receives translated content items 118 from the machine translation services 114. As discussed above, the translated content items 118 can be received at different times from the various machine translation services 114. From operation 608, the routine 600 proceeds to operation 610, where the front-end service 102 determines whether the received translated content items 118 are to be transmitted to the computing device 106. As discussed above, the quality estimates 124 for the translated content items 118 can be utilized to make this determination in some configurations.

If the front-end service 102 determines that the translated content items 118 are to be transmitted to the computing device 106, the routine 600 proceeds to operation 612 where the front-end service 102 transmits the translated content items 118 received at operation 608 to be the computing device 106. The routine 600 then proceeds from operation 612 to operation 614, where the front-end service 102 determines if there are more translations to be received. If so, the routine 600 proceeds back to operation 608, where additional translated content items 110 can be received and provided to the computing device 106 in the manner described above. If no additional translations remain to be received, the routine 600 proceeds from operation 614 to operation 616, where it ends.

Figure 7A:
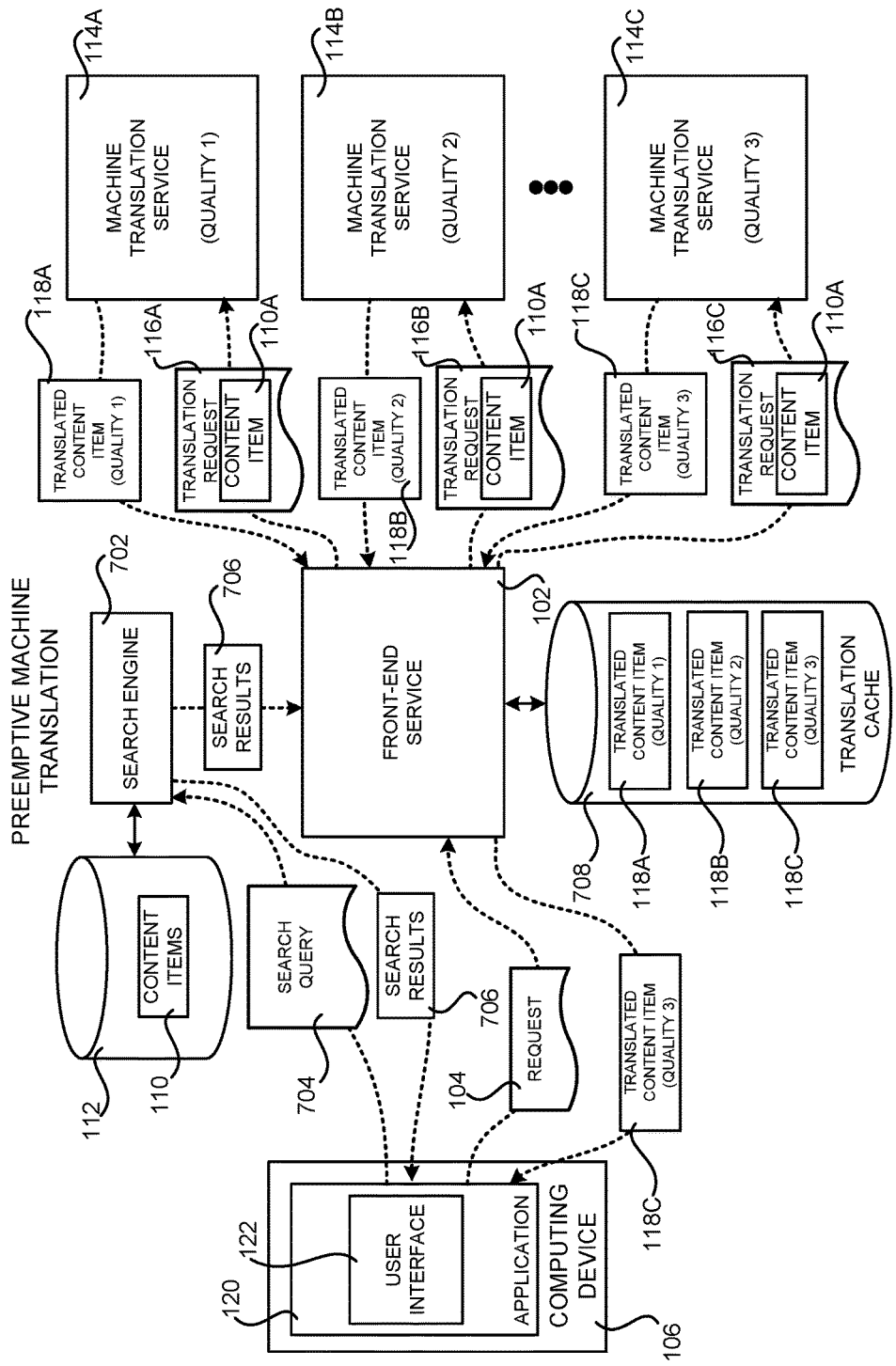
FIG. 7A is a computing system architecture diagram showing aspects of a computing system configured to provide preemptive machine translation, according to one particular configuration.

FIG. 7A is a computing system architecture diagram showing aspects of a computing system configured to provide preemptive machine translation, according to one particular configuration. The mechanisms described below with regard to FIGS. 7A, 7B and 8 can also be utilized with the computing system described above with regard to FIGS. 1-6 for providing incremental machine translation.

As shown in FIG. 7A, the front-end service 102 can operate in conjunction with a search engine 702. The search engine 702 provides functionality for searching pages 108 and/or content items 110 identified in the data store 112.

In order to search the page 108, the UI 122 can provide functionality for receiving search terms from a user of the computing device 106. The search terms can be provided to the search engine 702 in a search query 704. In response to receiving the search query 704, the search engine 702 performs a search of the pages 108 in the data store 112 and generates a list of search results 706. The list of search results 706 can identify pages 108 having content items 110 therein that match the search terms provided in the search query 704. The search results 706 can be provided to the computing device 106 and presented in the UI 122.

In one particular configuration, the search results 706 are also provided to the front-end service 102 for use in preemptive machine translation. The front-end service 102 can, in turn, identify the content items 110 referenced by one or more of the pages 108 in the search results 706.

Once the content items 110 referenced by the pages 108 in the search results 706 have been identified, the front-end service 102 can request translation of the content items 110 by the machine translation services 114. The various mechanisms described above with regard to FIGS. 1 and 2 can be utilized to select machine translation services 114 for translating the content items 110 referenced by or contained in the pages 108 in the search results 706. In the example shown in FIG. 7A, for instance, the content item 110A has been provided to each of the machine translation services 114 for translation in the manner described above with regard to FIGS. 1 and 2.

When the front-end service 102 receives the translated content items 118 from the machine translation services 114, the front-end service 102 stores the translated content items 118 in a cache 708. In this manner, when a request 104 is received for a page 108 identified in the search results 706, the translated content items 118 on the page have already been stored in the cache 708. The highest quality translated content item 118 that is stored in the cache 708, such as the translated content item 118C in FIG. 7, can then be provided to the application 120 from the cache 708 rather than by obtaining a translation from the machine translation services 114. In some configurations, the front-end service 102 can utilize the quality estimates 124 to determine whether translated content items 118 are to be stored in the cache 708. For example, if a translated content item 118 having a higher quality estimate 124 has been previously stored in the cache 708, a translation of the same content item 110 having a lower quality estimate 124 will not be stored in the cache 708.

In one particular configuration, the mechanism described above with regard to FIG. 7A for preemptive machine translation is performed for all of the pages 108 identified in the search results 706. In another configuration, the mechanism described above with regard to FIG. 7A for preemptive machine translation is performed for only a subset of the pages 108 identified in the search results 706. For instance, preemptive machine translation might only be performed for the N most relevant pages 108 in the search results 706. The optimal number N can be determined utilizing machine learning or other mechanisms. Additionally, in some configurations, content items 110 referenced by pages 108 that are referenced by pages 108 in the search results 706 can be preemptively translated in the manner described above. This process can continue for any arbitrary number of levels.

In other configurations, the content items 110 that are to be preemptively translated are identified based upon attributes other than being referenced by a page 108 in the search results 706. For example, and without limitation, a user's interaction (e.g. mouse cursor movement, keyboard input, etc.) with the UI 220 can be monitored and content items 110 for preemptive machine translation can be selected based upon the interaction. For example, if a user hovers the mouse cursor over a hyperlink to a page 108, the content items 110 on that page might be preemptively machine translated in the manner described above. As another example, if the user scrolls a page 108 to the bottom of the UI 122, content items 110 in pages 108 located at the bottom of the page 108 can be preemptively machine translated in the manner described above.

Figure 7B:
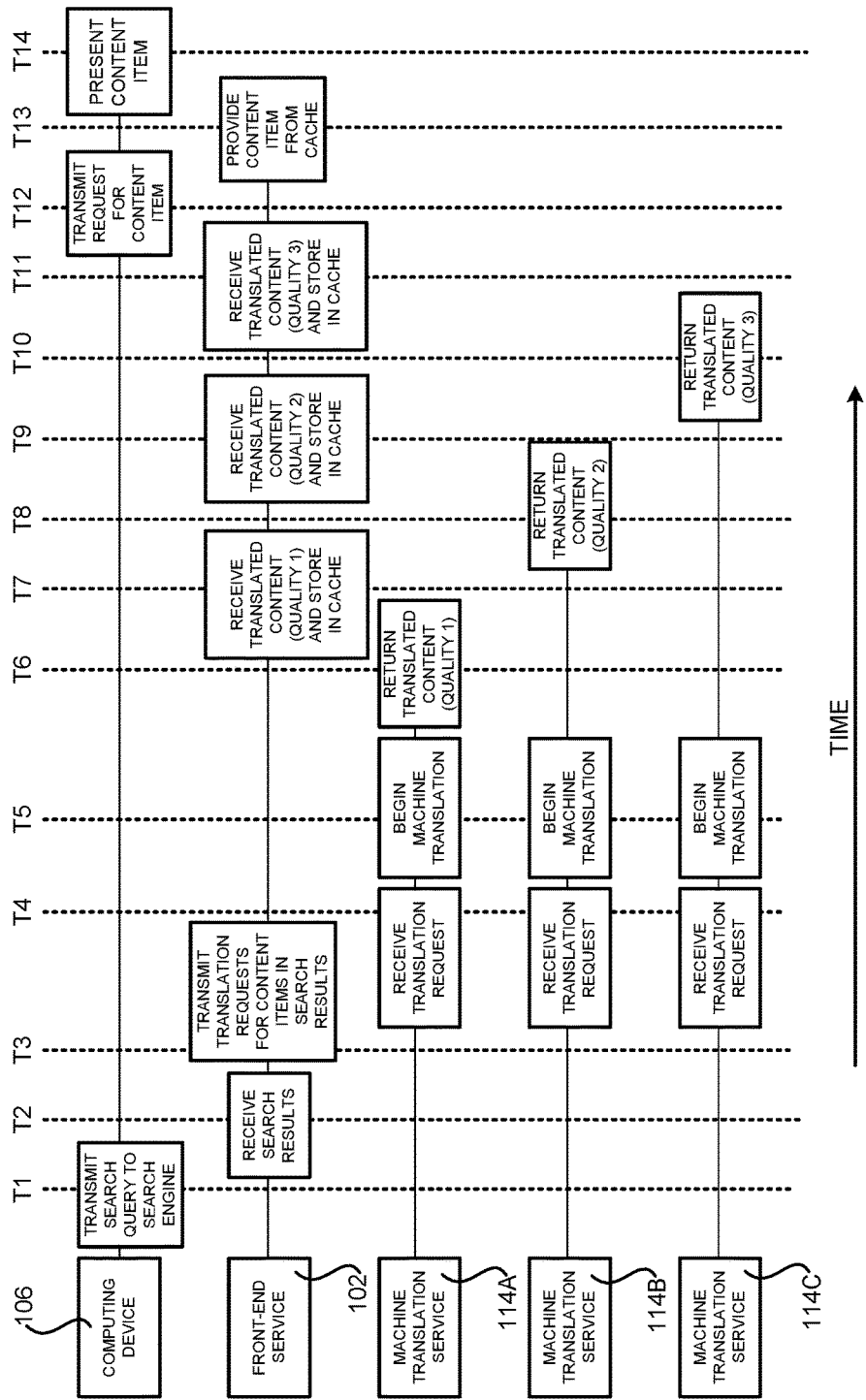
FIG. 7B is a timing diagram showing additional aspects of the computing system shown in FIG. 7A for providing preemptive machine translation, according to one particular configuration.

FIG. 7B is a timing diagram showing additional aspects of the computing system shown in FIG. 7A for providing preemptive machine translation, according to one particular configuration. In the illustrative example shown in FIG. 7B, the computing device 106 transmits a search query 704 to the search engine 702 at time T1. At time T2, the front-end service 102 receives the search results 706. Thereafter, at time T3, the front-end service 102 transmits translation requests 116 for content items 110A for content items 110 referenced by the search results 706 to the machine translation services 114A-114C. As shown in FIG. 7B, the translation requests 116 can be sent to the machine translation services 114A-114C simultaneously.

At or around time T4, the machine translation services 114A-114C receive the translation requests 116A-116C, respectively. The machine translation services 114A-114C then begin their respective translations of the content items 110 identified by the translation requests 116 at time T5.

Because, in the illustrated configuration, the machine translation service 114A is configured to provide a lower quality translation as compared to the other machine translation services 114B and 114C, the machine translation service 114A will typically but not always return the translated content item 118A first, at time T6. The front-end service 102 receives the translated content item 118A from the machine translation service 114A at time T7 and stores the translated content item 118A in the cache 708.

The machine translation service 114B will typically, but not always, return the translated content item 118B next, at time T8. The front-end service 102 receives the translated content item 118B from the machine translation service 114B at time T9. The front-end service 102 also stores the translated content item 118B in the cache 708.

The machine translation service 114C will typically, but not always, return the translated content item 118C last, at time T10. The front-end service 102 receives the translated content item 118C from the machine translation service 114C at time T11 and stores the translated content item 118C in the cache 708.

Subsequently, at time T12, the computing device 106 transmits a request for a content item 110 to the front-end service 102. For example, the computing device 106 might transmit a request for a page 708 identified in the search results 706. The front-end service 102 receives the request at time T13 and determines whether the requested content item 110 is in the cache 708. If so, the front-end service 102 retrieves the requested content item 110 from the cache 708 and provides the requested content item 110 to the computing device 106 in response to the request. The computing device 106 can then present or otherwise utilize the translated content item at time T14.

Figure 8:
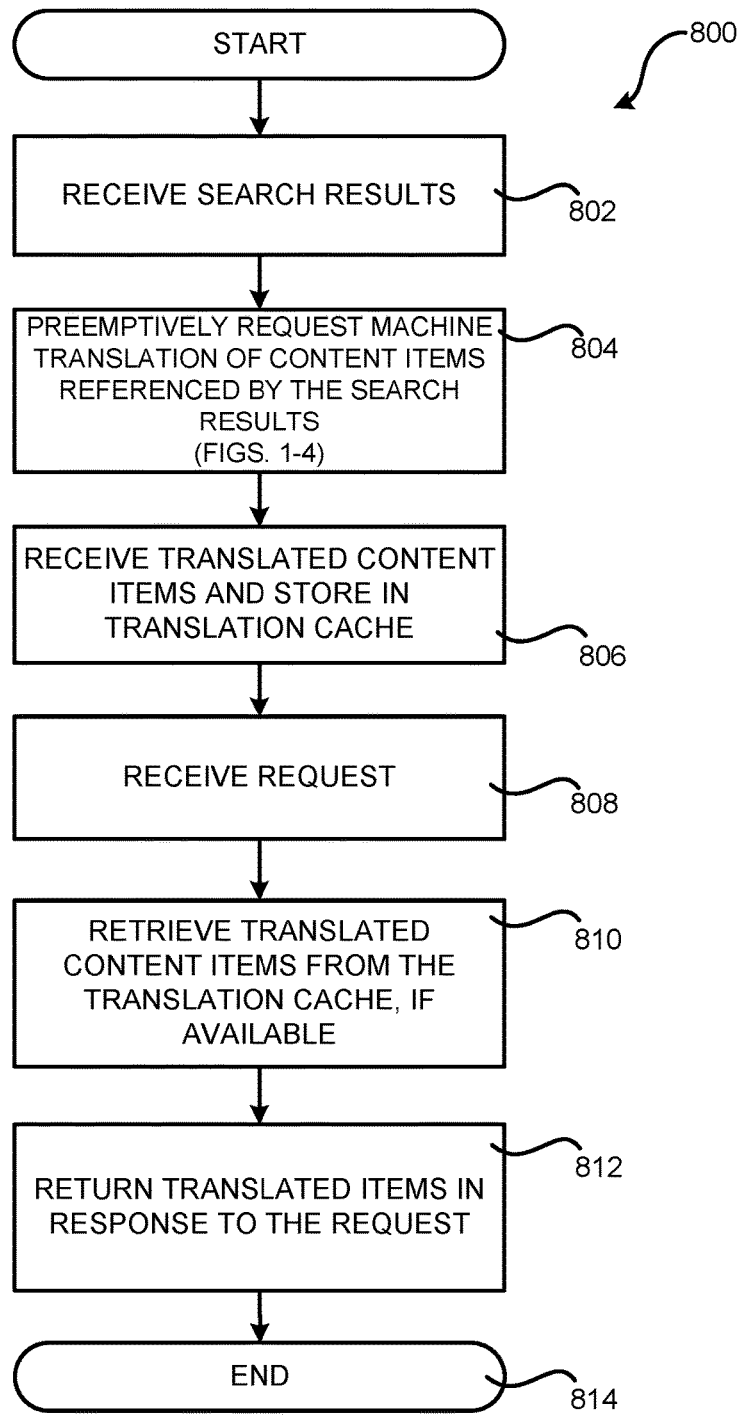
FIG. 8 is a flow diagram showing a routine that illustrates aspects of the operation of a front-end service for providing preemptive machine translation in the computing system shown in FIG. 7, according to one particular configuration.

FIG. 8 is a flow diagram showing a routine 800 that illustrates aspects of the operation of a front-end service 102 for providing preemptive machine translation in the computing system shown in FIG. 7, according to one particular configuration. The routine 800 begins at operation 802, where the front-end service 102 receives search results 706 from the search engine 702. The routine 800 then proceeds from operation 802 to operation 804, where the front-end service 102 preemptively requests machine translation of content items referenced by pages 108 in the search results 706. As mentioned above, the mechanisms described with reference to FIGS. 1-4 can be utilized to translate the content items 110.

From operation 804, the routine 800 proceeds to operation 806, where the front-end service 102 receives translated content items 118 from the machine translation services 114. The front-end service 102 also stores the received items 118 in the cache 708 at operation 806.

From operation 806, the routine 800 proceeds to operation 808, where the front-end service 102 receives a request 104 from the application 120. The routine 800 then proceeds from operation 808 to operation 810, where the front-end service 102 retrieves content items 110 in the requested page 108 from the cache 708, if available. If the content items 110 are not in the cache 708, the mechanisms described with reference to FIGS. 1-4 can be utilized to translate the content items 110. From operation 810, the routine 800 then proceeds to operation 812, where the translated content items 118 obtained from the cache 708, or another location, are returned to the application in response to the request 104. The application 120 can then present the translated content items 118 in the UI 122. From operation 812, the routine 800 proceeds to operation 814, where it ends.

Figure 9:
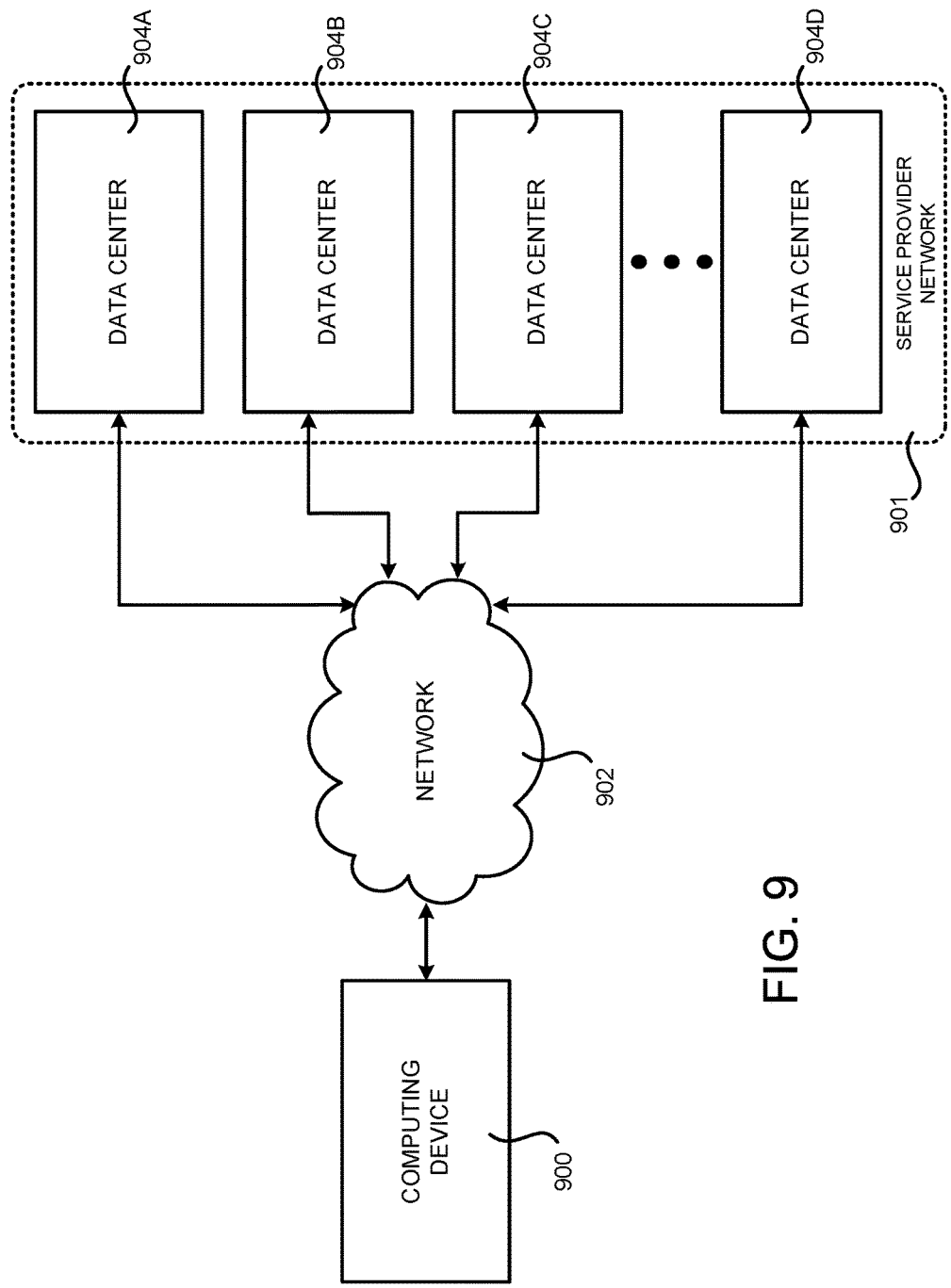
FIG. 9 is a system and network diagram that shows one illustrative operating environment for the configurations disclosed herein that includes a service provider network.

FIG. 9 is a system and network diagram that shows one illustrative operating environment for the configurations disclosed herein that includes a service provider network 901 that can be configured to implement the machine translation system described above. The service provider network 901 can execute network services that provide computing resources on a permanent or an as-needed basis. Among other types of functionality, the computing resources provided by the service provider network 901 can be utilized to implement the various network services described herein. As also discussed above, the computing resources provided by the service provider network 901 can include various types of computing resources, such as data processing resources like VM instances, data storage resources, networking resources, data communication resources, network services, and the like.

Each type of computing resource provided by the service provider network 901 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 901 can also be configured to provide other types of computing resources not mentioned specifically herein.

As also discussed above, the computing resources provided by the service provider network 901 are enabled in one implementation by one or more data centers 904A-904D (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative configuration for a data center 904 that can be utilized to implement the technologies disclosed herein will be described below with regard to FIG. 10.

Users of the service provider network 901 can access the computing resources provided by the service provider network 901 over a network 902, which can be a wide area communication network ("WAN"), such as the Internet, an intranet or an Internet service provider ("ISP") network or a combination of such networks. For example, and without limitation, a computing device 900 operated by a user of the service provider network 901 can be utilized to access the service provider network 901 by way of the network 902. It should be appreciated that a local-area network ("LAN"), the Internet, or any other networking topology known in the art that connects the data centers 904 to remote users can be utilized. It should also be appreciated that combinations of such networks can also be utilized.

Figure 10:
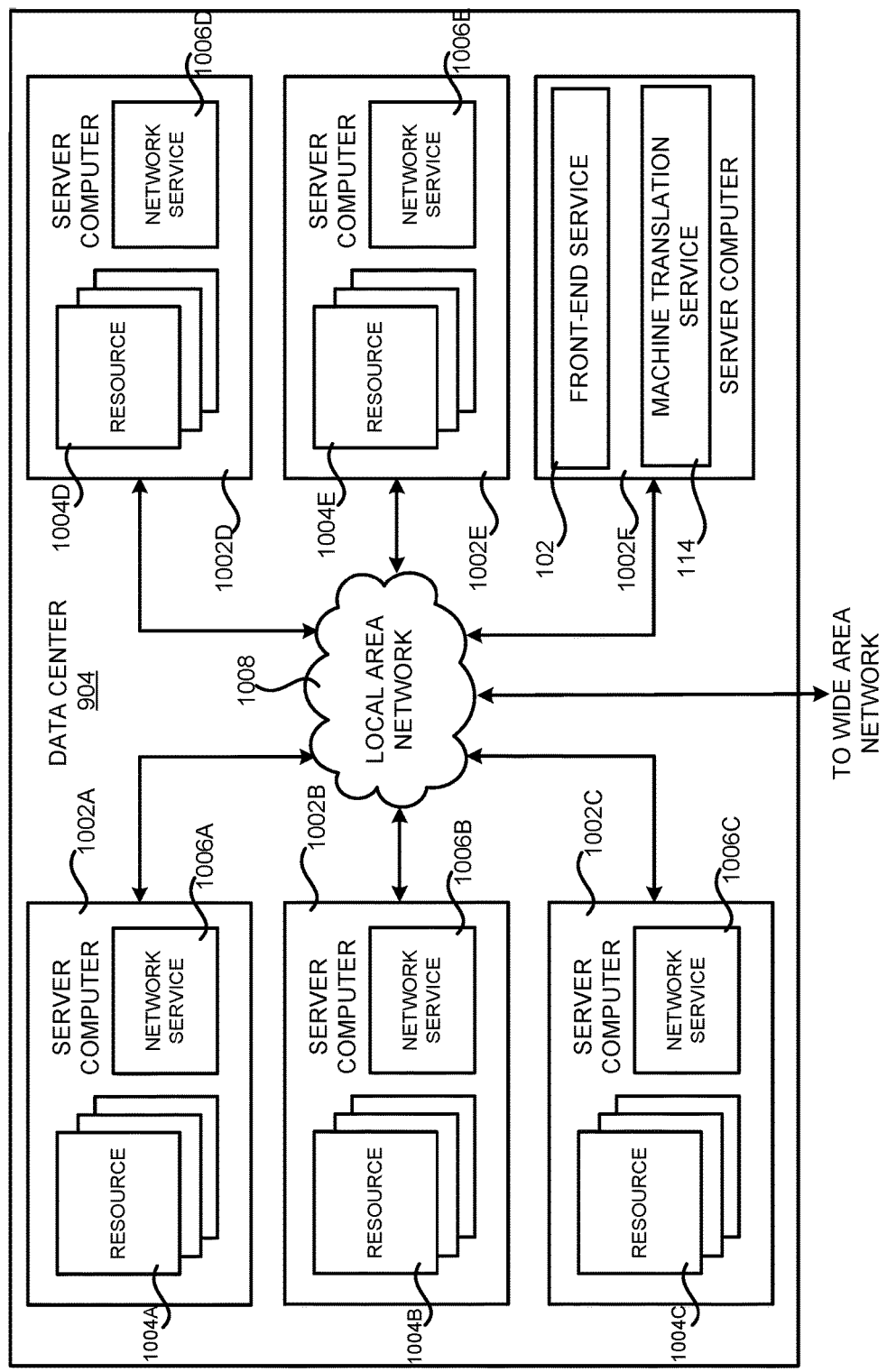
FIG. 10 is a computing system diagram illustrating a configuration for a data center that can be utilized to implement aspects of the technologies disclosed herein.

FIG. 10 is a computing system diagram that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing the computing resources 1004A-1004E.

The server computers 1002 can be standard tower, rack-mount, or blade server computers configured appropriately for providing the computing resources 1004 described herein (illustrated in FIG. 10 as the computing resources 1004A-1004E). As mentioned above, the computing resources 1004 provided by the service provider network 901 can be data processing resources such as VM instances or hardware computing systems, data storage resources, database resources, networking resources, and others. Some of the servers 1002 can also be configured to execute network services 1006A-1006E, respectively, capable of instantiating, providing and/or managing the computing resources 1004, some of which are described in detail below with regard to FIG. 11.

The data center 904 shown in FIG. 10 also includes a server computer 1002F that can execute some or all of the software components described above. For example, and without limitation, the server computer 1002F can be configured to execute the front-end service 102 and/or the machine translation services 114, which were described in detail above. The server computer 1002F can also be configured to execute other components and/or to store data for providing some or all of the functionality described herein. In this regard, it should be appreciated that the front-end service 102, the machine translation services 114, and the other services disclosed herein can execute on many other physical or virtual servers in the data centers 904 in various configurations.

In the example data center 904 shown in FIG. 10, an appropriate LAN 1008 is also utilized to interconnect the server computers 1002A-1002F. The LAN 1008 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904D, between each of the server computers 1002A-1002F in each data center 904, and, potentially, between computing resources 1004 in each of the data centers 904. It should be appreciated that the configuration of the data center 904 described with reference to FIG. 10 is merely illustrative and that other implementations can be utilized.

Figure 11:
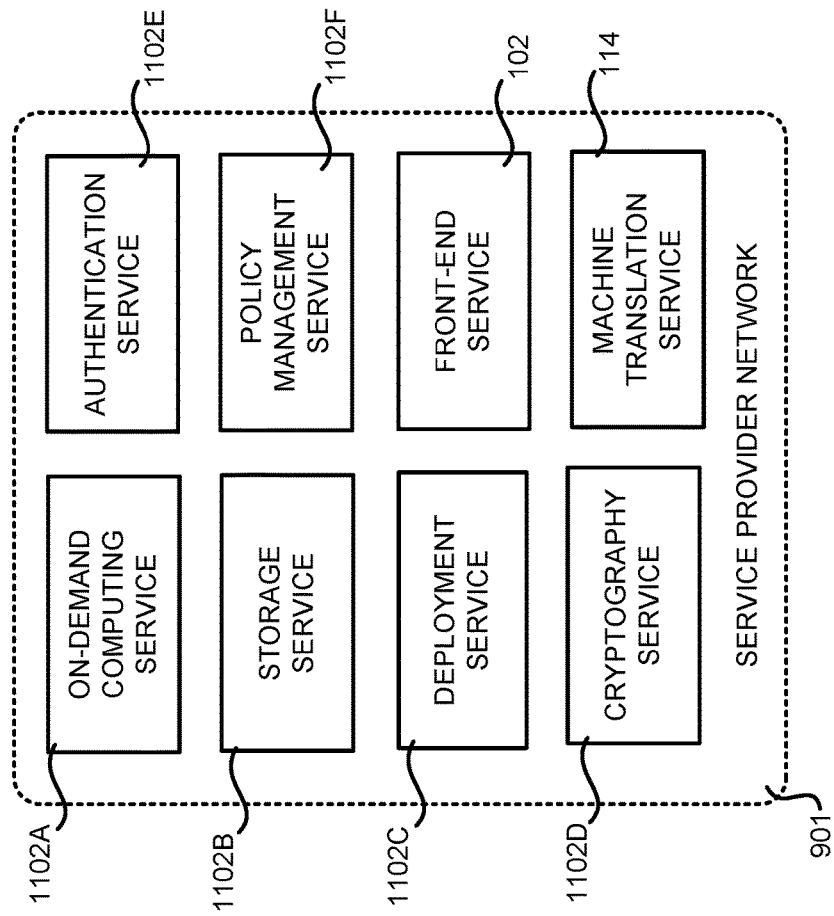
FIG. 11 is a network services diagram that shows aspects of several services that can be provided by and utilized within a service provider network configured to implement the various technologies disclosed herein.

FIG. 11 is a system and network diagram that shows aspects of several network services that can be provided by and utilized within a service provider network 901 in one configuration disclosed herein. In particular, and as discussed above, the service provider network 901 can provide a variety of network services to users of the service provider network 901 including, but not limited to, an on-demand computing service 1102A, a storage service 1102B, a deployment service 1102C, a cryptography service 1102D, an authentication service 1102E, and/or a policy management service 1102F, each of which is described in greater detail below. Additionally, the service provider network 901 can also provide other types of network services such as, but not limited to, the front-end service 102 and the machine translation services 114.

It should be appreciated that customers of the service provider network 901 can include organizations or individuals that utilize some or all of the services provided by the service provider network 901. As described above, a customer or other user can communicate with the service provider network 901 through a network, such as the network 902 shown in FIG. 9. Communications from a customer computing device to the service provider network 901 can cause the services provided by the service provider network 901 to operate in accordance with the described configurations or variations thereof.

It is noted that not all configurations described include the services described with reference to FIG. 11 and that additional network services can be provided in addition to or as an alternative to the services explicitly described herein. Each of the services shown in FIG. 11 can also expose Web service interfaces that enable a caller to submit appropriately configured application programming interface ("API") calls to the various services through Web service requests. In addition, each of the services can include service interfaces that enable the services to access each other (e.g., to enable a virtual computer system provided by the on-demand computing service 1102A to store data in or retrieve data from the storage service 1102B). Additional details regarding some of the services shown in FIG. 11 will now be provided.

The on-demand computing service 1102A can be a collection of computing resources configured to instantiate VM instances or to provide other types of computing resources 1004 on demand. For example, a customer or other user of the service provider network 901 can interact with the on-demand computing service 1102A (via appropriately configured and authenticated API calls, for example) to provision and operate VM instances that are instantiated on physical computing devices hosted and operated by the service provider network 901. The VM instances can be used for various purposes, such as to operate as servers supporting the network services described herein, a Web site, to operate business applications or, generally, to serve as computing resources for the customer. Other applications for the VM instances can be to support database applications, electronic commerce applications, business applications and/or other applications. Although the on-demand computing service 1102A is shown in FIG. 11, any other computer system or computer system service can be utilized in the service provider network 901 to implement the functionality disclosed herein, such as a computer system or computer system service that does not employ virtualization and instead provisions computing resources on dedicated or shared computers/servers and/or other physical devices.

The storage service 1102B can include software and computing resources that collectively operate to store data using block or file-level storage devices (and/or virtualizations thereof). The storage devices of the storage service 1102B can, for example, be operationally attached to virtual computer systems provided by the on-demand computing service 1102A to serve as logical units (e.g., virtual drives) for the computer systems. A storage device can also enable the persistent storage of data used/generated by a corresponding virtual computer system where the virtual computer system service might only provide ephemeral data storage.

The service provider network 901 can also include a cryptography service 1102D. The cryptography service 1102D can utilize storage services of the service provider network 901, such as the storage service 1102B, to store encryption keys in encrypted form, whereby the keys can be usable to decrypt customer keys accessible only to particular devices of the cryptography service 1102D. The cryptography service 1102D can also provide other types of functionality not specifically mentioned herein.

As illustrated in FIG. 11, the service provider network 901, in various configurations, also includes an authentication service 1102E and a policy management service 1102F. The authentication service 1102E, in one example, is a computer system (i.e., collection of computing resources 1004) configured to perform operations involved in authentication of users. For instance, one of the services shown in FIG. 11 can provide information from a user to the authentication service 1102E to receive information in return that indicates whether or not the requests submitted by the user are authentic.

The policy management service 1102F, in one example, is a network service configured to manage policies on behalf of customers or internal users of the service provider network 901. The policy management service 1102F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 901 can additionally maintain other services based, at least in part, on the needs of its customers. For instance, the service provider network 901 can maintain a deployment service 1102C for deploying program code and/or a database service (not shown in FIG. 11) for storing some or all of the data described herein. A database service can be a collection of computing resources that collectively operate to create, maintain, and allow queries to be performed on databases stored within the service provider network 901. For example, a user of the service provider network 901 can operate and manage a database from the database service by utilizing appropriately configured network API calls. This, in turn, can allow the user to maintain and potentially scale the operations in the database. Other services include object-level archival data storage services, and services that manage, monitor, interact with, or support other services. The service provider network 901 can also be configured with other network services not specifically mentioned herein in other configurations.

Figure 12:
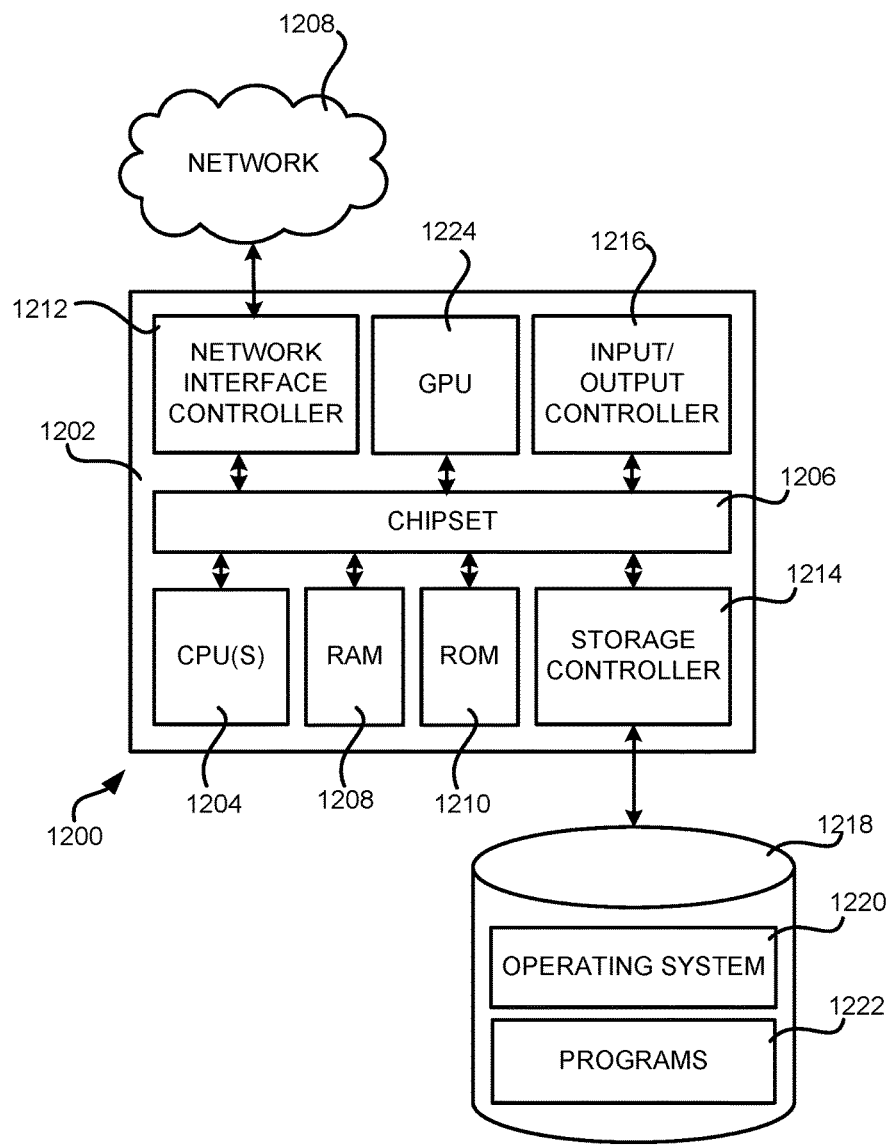
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a NIC 1212, such as a gigabit Ethernet adapter. The NIC 1212 is capable of connecting the computer 1200 to other computing devices over the network 1208. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 1218 can store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 1-8. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, a plotter, or other type of output device. The computer 1200 can also include a graphics processing unit ("GPU") 1224 in some configurations for use in speeding up certain types of machine translations or performing other types of processing. It will be appreciated that the computer 1200 might not include all of the components shown in FIG. 12, can include other components that are not explicitly shown in FIG. 12, or might utilize an architecture completely different than that shown in FIG. 12.

Embodiments of the disclosure can be described in view of the following clauses:

Clause 1: An apparatus, comprising: one or more processors; and one or more non-transitory computer-readable storage media having instructions stored thereupon which are executable by the one or more processors and which, when executed, cause the apparatus to: receive a request from a computing device for a translation of a content item; transmit a request to a first machine translation service to translate the content item from a first language to a second language, the first machine translation service configured to generate a first translation of the content item at a first quality level; transmit a request to a second machine translation service to translate the content item from the first language to the second language, the second machine translation service configured to generate a second translation of the content item at a second quality level; receive the first translation of the content item from the first machine translation service at a first time; provide the first translation of the content item to the computing device; receive the second translation of the content item from the second machine translation service at a second time after than the first time; and provide the second translation of the content item to the computing device.

Clause 2: The apparatus of clause 1, wherein the non-transitory computer-readable storage media has further instructions stored thereupon to: transmit a request to a third machine translation service to translate the content item from the first language to the second language, the third machine translation service configured to generate a third translation of the content item at a third quality level; receive the third translation of the content item from the third machine translation service at a third time after the second time; and provide the third translation of the content item to the computing device.

Clause 3: The apparatus of clauses 1 and 2, wherein the first content item is on a page, wherein the page further comprises a second content item, and wherein the non-transitory computer-readable storage media has further instructions stored thereupon to: select one of the first machine translation service or the second machine translation service for translating the second content item from the first language to the second language; transmit a request to the selected machine translation service to translate the second content item from the first language to the second language; receive the translation of the second content item from the selected machine translation service; and provide the translation of the second content item to the computing device.

Clause 4: The apparatus of clauses 1-3, wherein the selected machine translation service is selected based upon a location of the second content item on the page.

Clause 5: The apparatus of clauses 1-4, wherein the selected machine translation service is selected based upon a type of the second content item.

Clause 6: The apparatus of clauses 1-5, wherein the selected machine translation service is selected based upon a size of the second content item.

Clause 7: The apparatus of clauses 1-6, wherein the selected machine translation service is selected based upon an estimated difficulty of translating the second content item from the first language to the second language.

Clause 8: A computer-implemented method, comprising: transmitting a request for a translation of a content item; receiving, at a first time, a first translation of the content item generated by a first machine translation service, the first machine translation service configured to generate the first translation of the content item at a first quality level; determining whether to present the first translation based upon a quality estimate associated with the first translation; presenting the first translation of the content item in a user interface; receiving, at a second time after the first time, a second translation of the content item generated by a second machine translation service, the second machine translation service configured to generate the second translation of the content item at a second quality level; determining whether to present the second translation based upon a quality estimate associated with the first translation; and presenting the second translation of the content item in the user interface in place of the first translation of the content item.

Clause 9: The computer-implemented method of clause 8, further comprising: receiving, at a third time after the second time, one or more additional translations of the content item generated by one or more additional machine translation services, the one or more additional machine translation services configured to generate the one or more additional translations of the content item at one or more additional quality levels; and presenting the one or more additional translations of the content item in the user interface in place of the second translation of the content item.

Clause 10: The computer-implemented method of clauses 8 and 9 wherein the content item is on a page, wherein the page comprises a second content item, and wherein the method further comprises: receiving a translation of the second content item, the translation of the second content item generated by a selected one of the first machine translation service or the second machine translation service; and presenting the translation of the second content item in the user interface.

Clause 11: The computer-implemented method of clauses 8-10, wherein the selected machine translation service is selected based upon a location of the second content item on the page.

Clause 12: The computer-implemented method of clauses 8-11, wherein the selected machine translation service is selected based upon a type of the second content item.

Clause 13: The computer-implemented method of clauses 8-12, wherein the selected machine translation service is selected based upon a size of the second content item.

Clause 14: The computer-implemented method of clauses 8-13, wherein the selected machine translation service is selected based upon an estimated difficulty of translating the second content item.

Clause 15: A non-transitory computer-readable storage media having instructions stored thereupon that are executable by one or more processors and which, when executed, cause the one or more processors to: receive a request from a computing device for a content item; select one of a first machine translation service or a second machine translation service for translating the content item from a first language to a second language, the first machine translation service configured to generate a translation of the content item at a first quality level and the second machine translation service configured to generate a translation of the content item at a second quality level; transmit a request to the selected machine translation service to translate the content item from the first language to the second language; receive the translation of the content item from the selected machine translation service; and provide the translation of the content item to the computing device.

Clause 16: The non-transitory computer-readable storage media of clause 15, wherein the selected machine translation service comprises the first machine translation service, and wherein the non-transitory computer-readable storage media has further instructions stored thereupon to: transmit a request to the second machine translation service to translate the content item from the first language to the second language; receive a second translation of the content item from the second machine translation service; and provide the second translation of the content item to the computing device.

Clause 17: The non-transitory computer-readable storage media of clauses 15 and 16, wherein the selected machine translation service is selected based upon a location of the content item on a page.

Clause 18: The non-transitory computer-readable storage media of clauses 15-17, wherein the selected machine translation service is selected based upon a type of the content item.

Clause 19: The non-transitory computer-readable storage media of clauses 15-18, wherein the selected machine translation service is selected based upon a size of the content item.

Clause 20: The non-transitory computer-readable storage media of clauses 15-19, wherein the selected machine translation service is selected based upon an estimated difficulty of translating the content item.

Clause 21: An apparatus, comprising: one or more processors; and one or more non-transitory computer-readable storage media having instructions stored thereupon which are executable by the one or more processors and which, when executed, cause the apparatus to: receive search results identifying at least one content item; transmit a request to a first machine translation service to translate the content item from a first language to a second language prior to receiving a request for the content item, the first machine translation service configured to generate a first translation of the content item at a first quality level; transmit a request to a second machine translation service to translate the content item from the first language to the second language receiving a request for the content item, the second machine translation service configured to generate a second translation of the content item at a second quality level higher than the first quality level; receive the first translation of the content item from the first machine translation service; store the first translation of the content item in a cache; receive the second translation of the content item from the second machine translation service; store the second translation of the content item in the cache; receive the request for the content item; retrieve the second translation of the content item from the cache; and provide the second translation of the content item in response to the request for the content item.

Clause 22: The apparatus of clause 21, wherein the non-transitory computer-readable storage media has further instructions stored thereupon to: transmit a request to a third machine translation service to translate the content item from the first language to the second language, the third machine translation service configured to generate a third translation of the content item at a third quality level higher than the second quality level; receive the third translation of the content item from the third machine translation service; and store the third translation of the content item in the cache, and wherein the third translation of the content item is provided in response to the request for the content item.

Clause 23: The apparatus of clauses 21 and 22, wherein the first content item is on a page, wherein the page further comprises a second content item, and wherein the non-transitory computer-readable storage media has further instructions stored thereupon to: select one of the first machine translation service or the second machine translation service for translating the second content item from the first language to the second language; transmit a request to the selected machine translation service to translate the second content item from the first language to the second language prior to receiving the request for the content item; receive the translation of the second content item from the selected machine translation service; and store the translation of the second content item received from the selected machine translation service in the cache.

Clause 24: The apparatus of clauses 21-23, wherein the selected machine translation service is selected based upon a location of the second content item on the page.

Clause 25: The apparatus of clauses 21-24, wherein the selected machine translation service is selected based upon a type of the second content item.

Clause 26: The apparatus of clauses 21-25, wherein the selected machine translation service is selected based upon a size of the second content item.

Clause 27: The apparatus of clauses 21-26, wherein the selected machine translation service is selected based upon an estimated difficulty of translating the second content item from the first language to the second language.

Clause 28: A computer-implemented method, comprising: receiving search results identifying at least one content item; transmitting a request to a first machine translation service to translate the content item from a first language to a second language prior to receiving a request for the content item; receiving a first translation of the content item from the first machine translation service; storing the first translation of the content item in a cache; receiving a request for the content item; retrieving the first translation of the content item from the cache; and providing the first translation of the content item in response to the request for the content item.

Clause 29: The computer-implemented method of clause 28, further comprising: transmitting a request to a second machine translation service to translate the content item from the first language to the second language prior to receiving the request for the content item; receiving the second translation of the content item from the second machine translation service; and storing the second translation of the content item in the cache, and wherein the second translation of the content item is provided in response to the request for the content item.

Clause 30: The computer-implemented method of clauses 28 and 29, further comprising transmitting a request to a third machine translation service to translate the content item from the first language to the second language prior to receiving the request for the content item; receiving the third translation of the content item from the third machine translation service; and storing the third translation of the content item in the cache, and wherein the third translation of the content item is provided in response to the request for the content item.

Clause 31: The computer-implemented method of clause 30, wherein the first machine translation service is configured to generate the first translation of the content item at a first quality level, wherein the second machine translation service is configured to generate the second translation of the content item at a second quality level greater than the first quality level, and wherein the third machine translation service is configured to generate the third translation of the content item at a third quality level greater than the second quality level.

Clause 32: The computer-implemented method of clauses 30 and 31, wherein the first content item is on a page, wherein the page further comprises a second content item, and wherein the method further comprises: selecting one of the first machine translation service or the second machine translation service for translating the second content item from the first language to the second language; transmitting a request to the selected machine translation service to translate the second content item from the first language to the second language; receiving the translation of the second content item from the selected machine translation service; storing the translation of the second content item in the cache; and providing the translation of the second content item from the cache item in response to the request for the content item.

Clause 33: The computer-implemented method of clauses 30-32, wherein the selected machine translation service is selected based upon a location of the second content item on the page.

Clause 34: The computer-implemented method of clauses 30-33, wherein the selected machine translation service is selected based upon a type of the second content item.

Clause 35: The computer-implemented method of clauses 30-34, wherein the selected machine translation service is selected based upon an estimated difficulty of translating the second content item from the first language to the second language.

Clause 36: A non-transitory computer-readable storage media having instructions stored thereupon that are executable by one or more processors and which, when executed, cause the one or more processors to: receive search results identifying a content item; transmit a request to a first machine translation service to translate the content item from a first language to a second language prior to receiving a request for the content item; receive a first translation of the content item from the first machine translation service; store the first translation of the content item; receive a request for the content item; and provide the first translation of the content item in response to the request for the content item.

Clause 37: The non-transitory computer-readable storage media of clause 36, having further instructions stored thereupon to: transmit a request to a second machine translation service to translate the content item from the first language to the second language prior to receiving the request for the content item; receive the second translation of the content item from the second machine translation service; and store the second translation of the content item, and wherein the second translation of the content item is provided in response to the request for the content item.

Clause 38: The non-transitory computer-readable storage media of clauses 36 and 37, wherein the first content item is on a page, wherein the page further comprises a second content item, and wherein the non-transitory computer-readable storage media has further instructions stored thereupon to: select one of the first machine translation service or the second machine translation service for translating the second content item from the first language to the second language; transmit a request to the selected machine translation service to translate the second content item from the first language to the second language; receive the translation of the second content item from the selected machine translation service; and provide the translation of the second content item from the cache item in response to the request for the content item.

Clause 39: The non-transitory computer-readable storage media of clauses 36-38, wherein the selected machine translation service is selected based upon a location of the second content item on the page.

Clause 40: The non-transitory computer-readable storage media of clauses 36-39, wherein the selected machine translation service is selected based upon an estimated difficulty of translating the second content item.

Based on the foregoing, it should be appreciated that technologies for incremental and preemptive translation have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus as part of one or more computing devices, comprising:
   one or more processors; and
   one or more non-transitory computer-readable storage media having instructions stored thereupon which are executable by the one or more processors and which, when executed, cause the apparatus to:
   receive results of a search requested by a client computing device, the search results identifying content pages corresponding to terms for the search;
   identify, from one or more of the content pages in the received search results, a content item requiring translation;
   at least in part in response to the received search results and prior to receiving a request for the content item from the client computing device, transmit a request to a first machine translation service to translate the content item from a first language to a second language, the first machine translation service configured to generate a first translation of the content item at a first quality level and to compute a quality estimate for the first translation;
   at least in part in response to the received search results and prior to receiving the request for the content item from the client computing device, transmit a request to a second machine translation service to translate the content item from the first language to the second language, the second machine translation service configured to generate a second translation of the content item at a second quality level and to compute a quality estimate for the second translation;
   receive the first translation of the content item from the first machine translation service;
   store the first translation of the content item in a cache;
   receive the second translation of the content item from the second machine translation service;
   store the second translation of the content item in the cache;
   receive the request for the content item from the client computing device;
   retrieve a highest quality translated content item from among the stored translations of the content item in the cache based, at least in part, on a comparison of the quality estimates with a threshold; and
   provide the highest quality translated content item in response to the request for the content item.

2. The apparatus of claim 1, wherein the non-transitory computer-readable storage media has further instructions stored thereupon to:
   at least in part in response to the received search results and prior to receiving the request for the content item from the client computing device, transmit a request to a third machine translation service to translate the content item from the first language to the second language, the third machine translation service configured to generate a third translation of the content item at a third quality level and to generate a quality estimate for the third translation;
   receive the third translation of the content item from the third machine translation service; and store the third translation of the content item in the cache, and wherein the third translation of the content item is provided as the highest quality translated content item in response to the request for the content item.

3. The apparatus of claim 1, wherein the first content item is on a page, wherein the page further comprises a second content item, and wherein the non-transitory computer-readable storage media has further instructions stored thereupon to:

select one of the first machine translation service or the second machine translation service for translating the second content item from the first language to the second language;

at least in part in response to the received search results and prior to receiving the request for the content item from the client computing device, transmit a request to the selected machine translation service to translate the second content item from the first language to the second language;

receive the translation of the second content item from the selected machine translation service; and store the translation of the second content item received from the selected machine translation service in the cache.

4. The apparatus of claim 3, wherein the selected machine translation service is selected based upon a location of the second content item on the page.

5. The apparatus of claim 3, wherein the selected machine translation service is selected based upon a type of the second content item.

6. The apparatus of claim 3, wherein the selected machine translation service is selected based upon a size of the second content item.

7. The apparatus of claim 3, wherein the selected machine translation service is selected based upon an estimated difficulty of translating the second content item from the first language to the second language.

8. A computer-implemented method, comprising:
receiving at one or more computing devices search results of a search requested by a client computing device, the search results identifying content pages corresponding to terms for the search;

identifying, from one or more of the content pages in the received search results, a content item requiring translation;

at least in part in response to the search results and prior to receiving a request for the content item from the client computing device, transmitting a request to a first machine translation service to translate the content item from a first language to a second language;

receiving a first translation of the content item from the first machine translation service;

storing the first translation of the content item in a cache;

receiving a request for the content item from the client computing device;

retrieving a highest quality translated content item from among one or more translations of the content item stored in the cache; and providing the highest quality translated content item in response to the request for the content item.

9. The computer-implemented method of claim 8, further comprising:

at least in part in response to the search results and prior to receiving a request for the content item from the client computing device, transmitting a request to a second machine translation service to translate the content item from the first language to the second language;

receiving the second translation of the content item from the second machine translation service; and storing the second translation of the content item in the cache, and wherein the second translation of the content item is provided as the highest quality translated content item in response to the request for the content item.

10. The computer-implemented method of claim 9, further comprising, at least in part in response to the search results and prior to receiving a request for the content item from the client computing device, transmitting a request to a third machine translation service to translate the content item from the first language to the second language prior to receiving the request for the content item;

receiving the third translation of the content item from the third machine translation service; and storing the third translation of the content item in the cache, and wherein the third translation of the content item is provided as the highest quality translated content item in response to the request for the content item.

11. The computer-implemented method of claim 10, wherein the first machine translation service is configured to generate the first translation of the content item at a first quality level, wherein the second machine translation service is configured to generate the second translation of the content item at a second quality level greater than the first quality level, and wherein the third machine translation service is configured to generate the third translation of the content item at a third quality level greater than the second quality level.

12. The computer-implemented method of claim 9, wherein the first content item is on a page, wherein the page further comprises a second content item, and wherein the method further comprises:

selecting one of the first machine translation service or the second machine translation service for translating the second content item from the first language to the second language;

transmitting a request to the selected machine translation service to translate the second content item from the first language to the second language;

receiving the translation of the second content item from the selected machine translation service;

storing the translation of the second content item in the cache; and providing the translation of the second content item from the cache in response to the request for the content item.

13. The computer-implemented method of claim 12, wherein the selected machine translation service is selected based upon a location of the second content item on the page.

14. The computer-implemented method of claim 12, wherein the selected machine translation service is selected based upon a type of the second content item.

15. The computer-implemented method of claim 12, wherein the selected machine translation service is selected based upon an estimated difficulty of translating the second content item from the first language to the second language.

16. A non-transitory computer-readable storage media having instructions stored thereupon that are executable by one or more processors and which, when executed, cause the one or more processors to:

receive at one or more computing devices search results of a search requested by a client computing device, the search results identifying content pages corresponding to terms for the search;

identify, from one or more of the content pages in the received search results, a content item requiring translation;

at least in part in response to the search results and prior to receiving a request for the content item from the client computing device, transmit a request to a first machine translation service to translate the content item from a first language to a second language;

receive a first translation of the content item from the first machine translation service;

store the first translation of the content item;

receive a request for the content item from the client computing device; and provide a highest quality translated content item from among one or more stored translations of the content item in response to the request for the content item.

17. The non-transitory computer-readable storage media of claim 16, having further instructions stored thereupon to:

at least in part in response to the search results and prior to receiving a request for the content item from the client computing device, transmit a request to a second machine translation service to translate the content item from the first language to the second language;

receive the second translation of the content item from the second machine translation service; and store the second translation of the content item, and wherein the second translation of the content item is provided as the highest quality translated content item in response to the request for the content item.

18. The non-transitory computer-readable storage media of claim 17, wherein the first content item is on a page, wherein the page further comprises a second content item, and wherein the non-transitory computer-readable storage media has further instructions stored thereupon to:

select one of the first machine translation service or the second machine translation service for translating the second content item from the first language to the second language;

transmit a request to the selected machine translation service to translate the second content item from the first language to the second language;

receive the translation of the second content item from the selected machine translation service; and provide the translation of the second content item in response to the request for the content item.

19. The non-transitory computer-readable storage media of claim 18, wherein the selected machine translation service is selected based upon a location of the second content item on the page.

20. The non-transitory computer-readable storage media of claim 18, wherein the selected machine translation service is selected based upon an estimated difficulty of translating the second content item.

* * * * *